United States Patent
Yoon et al.

(10) Patent No.: US 12,461,769 B2
(45) Date of Patent: *Nov. 4, 2025

(54) SIGNAL PROCESSING DEVICE AND DISPLAY APPARATUS FOR VEHICLES INCLUDING THE SAME

(71) Applicant: LG Electronics Inc., Seoul (KR)

(72) Inventors: Jaegu Yoon, Seoul (KR); Hyoungkyu Choi, Seoul (KR); Heemin Lee, Seoul (KR); Sunhee Lim, Seoul (KR); Dongwoo Han, Seoul (KR); Dongkyu Lee, Seoul (KR); Dukyung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

This patent is subject to a terminal disclaimer.

(21) Appl. No.: 17/770,103

(22) PCT Filed: Jul. 21, 2021

(86) PCT No.: PCT/KR2021/009402
§ 371 (c)(1),
(2) Date: Apr. 19, 2022

(87) PCT Pub. No.: WO2022/181898
PCT Pub. Date: Sep. 1, 2022

(65) Prior Publication Data
US 2024/0143360 A1    May 2, 2024

(30) Foreign Application Priority Data

Feb. 26, 2021  (KR) .................. 10-2021-0026453
Apr. 23, 2021  (KR) .................. 10-2021-0053004

(51) Int. Cl.
*G06F 3/00*        (2006.01)
*B60K 35/21*      (2024.01)
(Continued)

(52) U.S. Cl.
CPC ........ *G06F 9/45558* (2013.01); *B60K 35/213* (2024.01); *B60K 35/22* (2024.01);
(Continued)

(58) Field of Classification Search
CPC ...................................................... G06F 9/455
See application file for complete search history.

(56) References Cited

U.S. PATENT DOCUMENTS 5,369,749 A  * 11/1994  Baker ................. G06F 15/17
                                                     710/1
7,034,476 B2 *  4/2006  Wang ................... B60L 15/10
                                                     318/432
(Continued)

FOREIGN PATENT DOCUMENTS

JP        2014139772        7/2014
JP        6523298           5/2019
(Continued)

OTHER PUBLICATIONS

Peter van der Perk, A Distributed Safety Mechanism for Autonomous Vehicle Software Using Hypervisors. (Year: 2019).*

(Continued)

*Primary Examiner* — Lechi Truong
(74) *Attorney, Agent, or Firm* — Fish & Richardson P.C.

(57) ABSTRACT

A signal processing device and a display apparatus for vehicles including the same are disclosed. The signal processing device includes a processor configured to process a signal for a display mounted in a vehicle, wherein the processor is configured to execute first to third virtual machines on a hypervisor in the processor, the second virtual machine is operated for a first display, the third virtual machine is operated for a second display, and the first virtual machine in the processor is configured to control a shared memory based on the hypervisor for transmission of iden- (Continued)

tical data to the second virtual machine and the third virtual machine. Consequently, it is possible for a plurality of displays in the vehicle to display identical images in a synchronized state.

16 Claims, 20 Drawing Sheets

(51) Int. Cl.
  *B60K 35/22*    (2024.01)
  *B60K 35/29*    (2024.01)
  *G06F 3/14*     (2006.01)
  *G06F 9/455*    (2018.01)
  *G06F 9/54*     (2006.01)
  *B60K 35/00*    (2006.01)
  *B60R 16/023*   (2006.01)

(52) U.S. Cl.
  CPC ............ *B60K 35/29* (2024.01); *G06F 3/1423* (2013.01); *G06F 9/544* (2013.01); *B60K 35/00* (2013.01); *B60K 2360/18* (2024.01); *B60R 16/023* (2013.01); *G06F 2009/4557* (2013.01); *G06F 2009/45579* (2013.01); *G06F 2009/45583* (2013.01); *G06F 2009/45595* (2013.01)

(56) References Cited

U.S. PATENT DOCUMENTS

| | | | |
|---|---|---|---|
| 10,340,996 B1* | 7/2019 | Wakid | H04B 7/0639 |
| 2014/0149981 A1* | 5/2014 | Luxenberg | H04L 49/9005 |
| | | | 718/1 |
| 2017/0039084 A1* | 2/2017 | Atsmon | H04L 67/12 |
| 2017/0173262 A1* | 6/2017 | Veltz | G16H 20/17 |
| 2019/0042918 A1* | 2/2019 | Meyer | G06N 3/045 |
| 2020/0034262 A1* | 1/2020 | Bemanian | G06F 11/2242 |
| 2020/0334063 A1* | 10/2020 | Wu | H04L 41/40 |
| 2020/0349260 A1* | 11/2020 | Ryan | G06F 9/45558 |
| 2020/0389518 A1* | 12/2020 | Zhang | H04L 67/108 |
| 2020/0401434 A1* | 12/2020 | Thampi | H04J 3/0667 |
| 2021/0026019 A1* | 1/2021 | Gahagan | G01S 17/931 |
| 2021/0219002 A1* | 7/2021 | Barnes | B64D 11/00155 |
| 2022/0417055 A1* | 12/2022 | Johansson | G06F 13/28 |
| 2023/0096468 A1* | 3/2023 | Ong | H04L 47/2441 |
| | | | 370/235 |
| 2024/0014983 A1* | 1/2024 | Ratasuk | H04L 1/1896 |

FOREIGN PATENT DOCUMENTS

| | | |
|---|---|---|
| JP | 2020201761 | 12/2020 |
| KR | 20130000253 | 1/2013 |
| KR | 20200110229 | 9/2020 |
| WO | 2015/103376 A1 | 7/2015 |
| WO | WO-2020231952 A1 * 11/2020 | ........... G06F 21/575 |

OTHER PUBLICATIONS

Pin Lu, Virtual Machine Memory Access Tracing With Hypervisor Exclusive Cache (Year: 2007).*

Cochlovius et al., "Frame-Synchronous, Distributed Video-decoding for In-Vehicle Infotainment Systems," 2011 IEEE International Conference on Consumer Electronics—Berlin (ICCE—Berlin), Sep. 6, 2011, pp. 226-228, XP031968601.

Extended European Search Report in European Appln. No. 21928193.8, mailed on Jan. 29, 2025, 11 pages.

Knorr, Johann, "Exploring Xen/KVM in prototyping an automotive use-case," CISTER Research Center, Dec. 31, 2019, pp. 1-72, X9093239696, Retrieved from the Internet: URLcister.isep.ipp.pt/doc/exploring_xen_kvm_in_prototyping_an_automotive_use_case/1597/view.pdf.

Wu et al., "Comprehensive VM Protection AgainstUntrusted Hypervisor Through Retrofitted AMO Memory Encryption," 2018 IEEE International Symposium on High Performance Computer Architecture, Feb. 24, 2018, pp. 441-453, XP033341999.

* cited by examiner

SIGNAL PROCESSING DEVICE AND DISPLAY APPARATUS FOR VEHICLES INCLUDING THE SAME

CROSS-REFERENCE TO RELATED APPLICATIONS

This application is a National Stage application under 35 U.S.C. § 371 of International Application No. PCT/KR2021/009402, filed on Jul. 21, 2021, which claims the benefit of Korean Patent Application No. 10-2021-0026453, filed on Feb. 26, 2021 and Korean Patent Application No. 10-2021-0053004, filed on Apr. 23, 2021. The disclosures of the prior applications are incorporated by reference in their entirety.

BACKGROUND OF THE INVENTION

1. Field of the Invention

The present disclosure relates to a signal processing device and a display apparatus for vehicles including the same, and more particularly to a signal processing device capable of performing control such that a plurality of displays in a vehicle displays identical images in a synchronized state and a display apparatus for vehicles including the same.

2. Description of the Related Art

A vehicle is an apparatus that a driver moves in a desired direction. A representative example of the vehicle is a car.

Meanwhile, a display apparatus for vehicles is mounted in the vehicle for convenience of users who use the vehicle.

For example, a display is disposed in a cluster in order to display various kinds of information. Meanwhile, in order to display vehicle driving information, various displays, such as an audio video navigation (AVN) display, are mounted in the vehicle, in addition to the cluster.

In the case in which the number of displays in the display apparatus for vehicles is increased, however, signal processing for the displays is complicated.

Particularly, in the case in which identical images are displayed on a plurality of displays, synchronization is important.

SUMMARY

An object of the present disclosure is to provide a signal processing device capable of performing control such that a plurality of displays in a vehicle displays identical images in a synchronized state and a display apparatus for vehicles including the same.

Another object of the present disclosure is to provide a signal processing device capable of performing control such that high-speed data communication is performed between a plurality of virtual machines and a display apparatus for vehicles including the same.

A further object of the present disclosure is to provide a signal processing device capable of performing control such that high-speed data communication is performed even though a plurality of virtual machines is driven by different operating systems and a display apparatus for vehicles including the same.

In accordance with an aspect of the present disclosure, the above and other objects can be accomplished by the provision of a signal processing device including a processor configured to process a signal for a display mounted in a vehicle, wherein the processor is configured to execute first to third virtual machines on a hypervisor in the processor, the second virtual machine is operated for a first display, the third virtual machine is operated for a second display, and the first virtual machine in the processor is configured to control a shared memory based on the hypervisor for transmission of identical data to the second virtual machine and the third virtual machine.

Meanwhile, the first virtual machine in the processor may receive and process position information data variable due to movement, and may provide the processed data to the second virtual machine or the third virtual machine.

Meanwhile, the second virtual machine and the third virtual machine may be driven by different operating systems.

Meanwhile, the first virtual machine in the processor may transmit information regarding the shared memory including key data for data access to the second virtual machine and the third virtual machine after setting of the shared memory.

Meanwhile, the first virtual machine in the processor may include an input and output server interface and a security manager, and each of the second virtual machine and the third virtual machine may include an input and output client interface.

Meanwhile, in order to transmit data from the input and output server interface in the first virtual machine to the input and output client interface, the security manager may allocate the shared memory, and the input and output client interface may transmit a request for connection to the input and output server interface after allocation of the shared memory.

Meanwhile, the input and output server interface may transmit information regarding the shared memory including key data for data access to the input and output client interface after allocation of the shared memory, and the input and output client interface may access the shared memory based on the key data.

Meanwhile, the input and output server interface may receive information regarding a first buffer in the shared memory, the first buffer being empty, may write first data in the first buffer in the shared memory, and may transmit buffer information of the first buffer to the input and output client interfaces in the second virtual machine and the third virtual machine.

Meanwhile, the reference count of the first buffer may be changed in a first direction based on writing of the first data in the first buffer, and in case in which copying of the first data to the first buffer is completed, the reference count of the first buffer may be changed in a second direction, the second direction being opposite the first direction.

Meanwhile, the shared memory may include a plurality of buffers, the first virtual machine may write first frame data to third frame data respectively in a first buffer to a third buffer, among the plurality of buffers, and the input and output client interfaces in the second virtual machine and the third virtual machine may sequentially copy the first frame data to the third frame data from the first buffer to the third buffer.

Meanwhile, after copying of the first frame data from the first buffer by the input and output client interface in the third virtual machine is completed, the second virtual machine may copy the second frame data from the second buffer.

Meanwhile, the first virtual machine may include a position information driver configured to process position information, a touch driver configured to process touch input, and a camera driver configured to process an image from a camera, and may set the shared memory based on the hypervisor for each of the position information driver, the touch driver, and the camera driver.

Meanwhile, the input and output server interface may set a first shared memory for transmission of image data from the camera driver, and may set a second shared memory for transmission of position information from the position information driver.

Meanwhile, key data of the first shared memory and key data of the second shared memory may be transmitted to the second virtual machine and the third virtual machine, and the second virtual machine and the third virtual machine may access the first shared memory and the second shared memory based on the key data of the first shared memory and the key data of the second shared memory.

Meanwhile, the signal processing device may further include a legacy virtual machine configured to receive and process Ethernet data, wherein the first virtual machine may receive, process, and output vehicle sensor data, position information data, camera image data, audio data, or touch input data.

Meanwhile, the first virtual machine may perform control such that the vehicle sensor data, the position information data, the camera image data, or the touch input data are written in the shared memory, for sharing identical data in the second virtual machine and the third virtual machine.

Meanwhile, the first virtual machine in the processor may receive and process wheel speed sensor data of the vehicle, and may transmit the processed wheel speed sensor data to at least one of the second virtual machine and the third virtual machine.

In accordance with another aspect of the present disclosure, there is provided a signal processing device including a processor configured to process a signal for a display mounted in a vehicle, wherein the processor is configured to execute first to third virtual machines on a hypervisor in the processor, and the first virtual machine in the processor is configured to transmit identical data to the second virtual machine and the third virtual machine in a synchronized state using a shared memory based on the hypervisor.

In accordance with a further aspect of the present disclosure, there is provided a display apparatus for vehicles including a first display, a second display, and a signal processing device including a processor configured to process signals for the first display and the second display.

Meanwhile, the signal processing device in the display apparatus for vehicles may transmit identical data to the plurality of virtual machines in a synchronized state, and may perform control such that images displayed on the plurality of displays are identical.

Advantageous Effects

As is apparent from the description, a signal processing device according to an embodiment of the present disclosure includes a processor configured to process a signal for a display mounted in a vehicle, wherein the processor is configured to execute first to third virtual machines on a hypervisor in the processor, the second virtual machine is operated for a first display, the third virtual machine is operated for a second display, and the first virtual machine in the processor is configured to control a shared memory based on the hypervisor for transmission of identical data to the second virtual machine and the third virtual machine. Consequently, it is possible for a plurality of displays in the vehicle to display identical images in a synchronized state.

Meanwhile, it is possible to perform high-speed data communication between a plurality of virtual machines.

Meanwhile, the first virtual machine in the processor may receive and process position information data variable due to movement, and may provide the processed data to the second virtual machine or the third virtual machine. Consequently, not 1:1 data communication but 1:N data communication using the shared memory may be performed between the virtual machines.

Meanwhile, the second virtual machine and the third virtual machine may be driven by different operating systems. Consequently, high-speed data communication may be performed even though the plurality of virtual machines is driven by different operating systems.

Meanwhile, the first virtual machine in the processor may transmit information regarding the shared memory including key data for data access to the second virtual machine and the third virtual machine after setting of the shared memory. Consequently, the second virtual machine and the third virtual machine may access the shared memory, and eventually the plurality of displays in the vehicle may display identical images in a synchronized state.

Meanwhile, the first virtual machine in the processor may include an input and output server interface and a security manager, and each of the second virtual machine and the third virtual machine may include an input and output client interface. Consequently, high-speed data communication between the plurality of virtual machines may be performed using the input and output server interface and the input and output client interface.

Meanwhile, in order to transmit data from the input and output server interface in the first virtual machine to the input and output client interface, the security manager may allocate the shared memory, and the input and output client interface may transmit a request for connection to the input and output server interface after allocation of the shared memory. Consequently, the second virtual machine and the third virtual machine may access the shared memory, and eventually the plurality of displays in the vehicle may display identical images in a synchronized state.

Meanwhile, the input and output server interface may transmit information regarding the shared memory including key data for data access to the input and output client interface after allocation of the shared memory, and the input and output client interface may access the shared memory based on the key data. Consequently, the second virtual machine and the third virtual machine may access the shared memory, and eventually the plurality of displays in the vehicle may display identical images in a synchronized state.

Meanwhile, the input and output server interface may receive information regarding a first buffer in the shared memory, the first buffer being empty, may write first data in the first buffer in the shared memory, and may transmit buffer information of the first buffer to the input and output client interfaces in the second virtual machine and the third virtual machine. Consequently, the second virtual machine and the third virtual machine may access the shared memory, and eventually the plurality of displays in the vehicle may display identical images in a synchronized state.

Meanwhile, the reference count of the first buffer may be changed in a first direction based on writing of the first data in the first buffer, and in case in which copying of the first data to the first buffer is completed, the reference count of the first buffer may be changed in a second direction, the second direction being opposite the first direction. After completion of copying, therefore, new data may be written in the first buffer.

Meanwhile, the shared memory may include a plurality of buffers, the first virtual machine may write first frame data to third frame data respectively in a first buffer to a third buffer, among the plurality of buffers, and the input and output client interfaces in the second virtual machine and the third virtual machine may sequentially copy the first frame data to the third frame data from the first buffer to the third buffer. Consequently, the second virtual machine and the third virtual machine may access the shared memory, and eventually the plurality of displays in the vehicle may display identical images in a synchronized state.

Meanwhile, after copying of the first frame data from the first buffer by the input and output client interface in the third virtual machine is completed, the second virtual machine may copy the second frame data from the second buffer. Consequently, synchronization between the second virtual machine and the third virtual machine may be performed.

Meanwhile, the first virtual machine may include a position information driver configured to process position information, a touch driver configured to process touch input, and a camera driver configured to process an image from a camera, and may set the shared memory based on the hypervisor for each of the position information driver, the touch driver, and the camera driver. Consequently, data for each driver may be shared using each shared memory.

Meanwhile, the input and output server interface may set a first shared memory for transmission of image data from the camera driver, and may set a second shared memory for transmission of position information from the position information driver. Consequently, image data and the position information may be shared by the second virtual machine and the third virtual machine.

Meanwhile, key data of the first shared memory and key data of the second shared memory may be transmitted to the second virtual machine and the third virtual machine, and the second virtual machine and the third virtual machine may access the first shared memory and the second shared memory based on the key data of the first shared memory and the key data of the second shared memory. Consequently, the virtual machines may share corresponding data.

Meanwhile, the signal processing device according to the embodiment of the present disclosure may further include a legacy virtual machine configured to receive and process Ethernet data, wherein the first virtual machine may receive, process, and output vehicle sensor data, position information data, camera image data, audio data, or touch input data. Data processed only by the legacy virtual machine and data processed by the first virtual machine may be distinguished from each other, whereby data processing may be efficiently performed.

In particular, the first virtual machine may process most of the data, whereby 1:N data sharing may be achieved.

Meanwhile, the first virtual machine may perform control such that the vehicle sensor data, the position information data, the camera image data, or the touch input data are written in the shared memory, for sharing identical data in the second virtual machine and the third virtual machine. Consequently, 1:N data sharing may be achieved.

Meanwhile, the first virtual machine in the processor may receive and process wheel speed sensor data of the vehicle, and may transmit the processed wheel speed sensor data to at least one of the second virtual machine and the third virtual machine. Consequently, at least one virtual machine may share the wheel speed sensor data of the vehicle.

Meanwhile, a signal processing device according to another embodiment of the present disclosure includes a processor configured to process a signal for a display mounted in a vehicle, wherein the processor is configured to execute first to third virtual machines on a hypervisor in the processor, and the first virtual machine in the processor is configured to transmit identical data to the second virtual machine and the third virtual machine in a synchronized state using a shared memory based on the hypervisor. Consequently, it is possible for a plurality of displays in the vehicle to display identical images in a synchronized state.

Meanwhile, it is possible to perform high-speed data communication between a plurality of virtual machines. Furthermore, high-speed data communication may be performed even though the plurality of virtual machines is driven by different operating systems.

Meanwhile, a display apparatus for vehicles according to an embodiment of the present disclosure includes a first display, a second display, and a signal processing device including a processor configured to process signals for the first display and the second display. Consequently, it is possible for a plurality of displays in a vehicle to display identical images in a synchronized state.

Meanwhile, it is possible to perform high-speed data communication between a plurality of virtual machines. Furthermore, high-speed data communication may be performed even though the plurality of virtual machines is driven by different operating systems.

Meanwhile, in the display apparatus for vehicles according to the embodiment of the present disclosure, the signal processing device may transmit identical data to the plurality of virtual machines in a synchronized state, and may perform control such that images displayed on the plurality of displays are identical. Consequently, the plurality of displays in the vehicle may display identical images in a synchronized state.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in preparation of the specification, and do not have or serve different meanings. Accordingly, the suffixes "module" and "unit" may be used interchangeably.

Figure 1A:
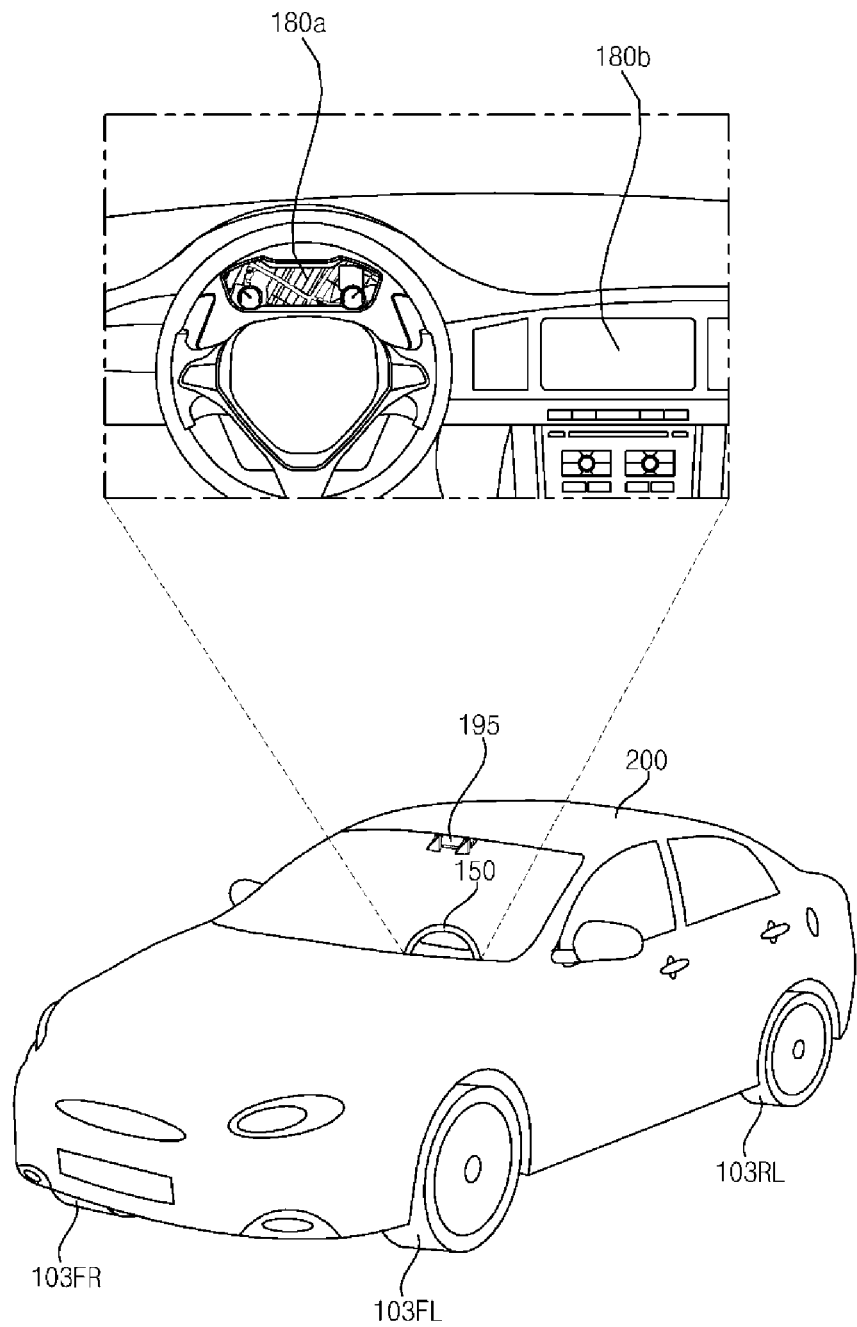
FIG. 1A is a view showing an example of the exterior and interior of a vehicle.

FIG. 1A is a view showing an example of the exterior and interior of a vehicle.

Referring to the figure, the vehicle 200 is moved by a plurality of wheels 103FR, 103FL, 103RL, . . . rotated by a power source and a steering wheel 150 configured to adjust an advancing direction of the vehicle 200.

Meanwhile, the vehicle 200 may be provided with a camera 195 configured to acquire an image of the front of the vehicle.

Meanwhile, the vehicle 200 may be further provided therein with a plurality of displays 180a and 180b configured to display images and information.

In FIG. 1A, a cluster display 180a and an audio video navigation (AVN) display 180b are illustrated as the plurality of displays 180a and 180b. In addition, a head up display (HUD) may also be used.

Meanwhile, the audio video navigation (AVN) display 180b may also be called a center information display.

The embodiment of the present disclosure proposes a scheme of a plurality of displays 180a and 180b constituting a display apparatus 100 for vehicles displaying identical images in a synchronized state.

In particular, a signal processing device 170 in the display apparatus 100 for vehicles transmits identical data to a plurality of virtual machines in a synchronized state, and performs control such that images displayed on the plurality of displays are identical. This will be described with reference to FIG. 5 and subsequent figures.

Meanwhile, the vehicle 200 described in this specification may be a concept including all of a vehicle having an engine as a power source, a hybrid vehicle having an engine and an electric motor as a power source, and an electric vehicle having an electric motor as a power source.

Figure 1B:
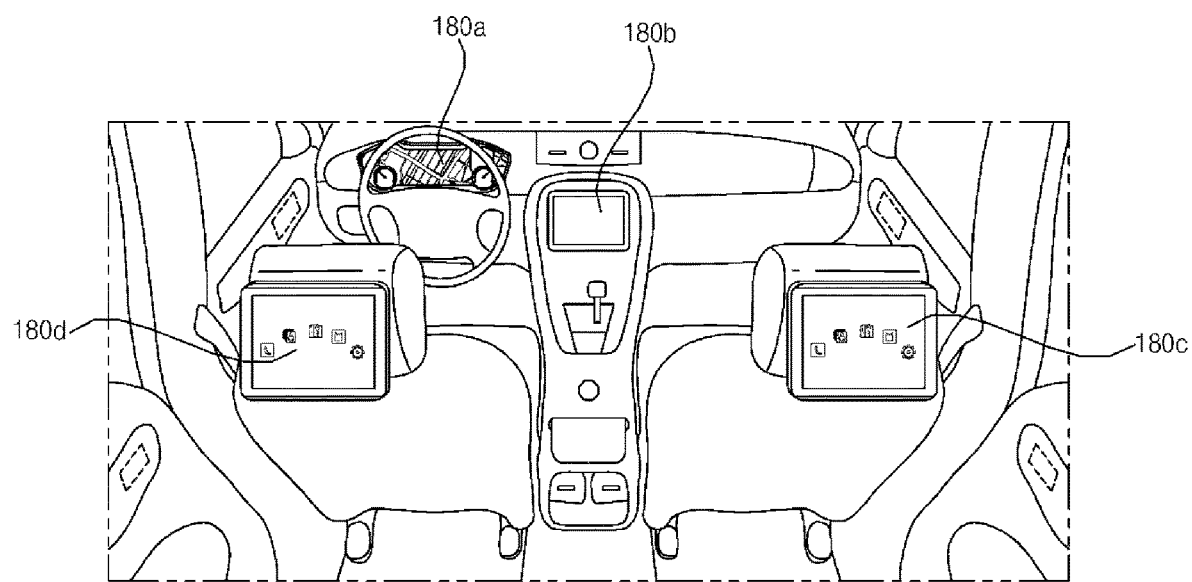
FIG. 1B is a view showing another example of the interior of the vehicle.

FIG. 1B is a view showing another example of the interior of the vehicle.

Referring to the figure, a cluster display 180a, an audio video navigation (AVN) display 180b, rear seat entertainment displays 180c and 180d, and a rear-view mirror display (not shown) may be mounted in the vehicle.

The embodiment of the present disclosure proposes a scheme of a plurality of displays 180a to 180d constituting a display apparatus 100 for vehicles displaying identical images in a synchronized state. This will be described with reference to FIG. 5 and subsequent figures.

Figure 2:
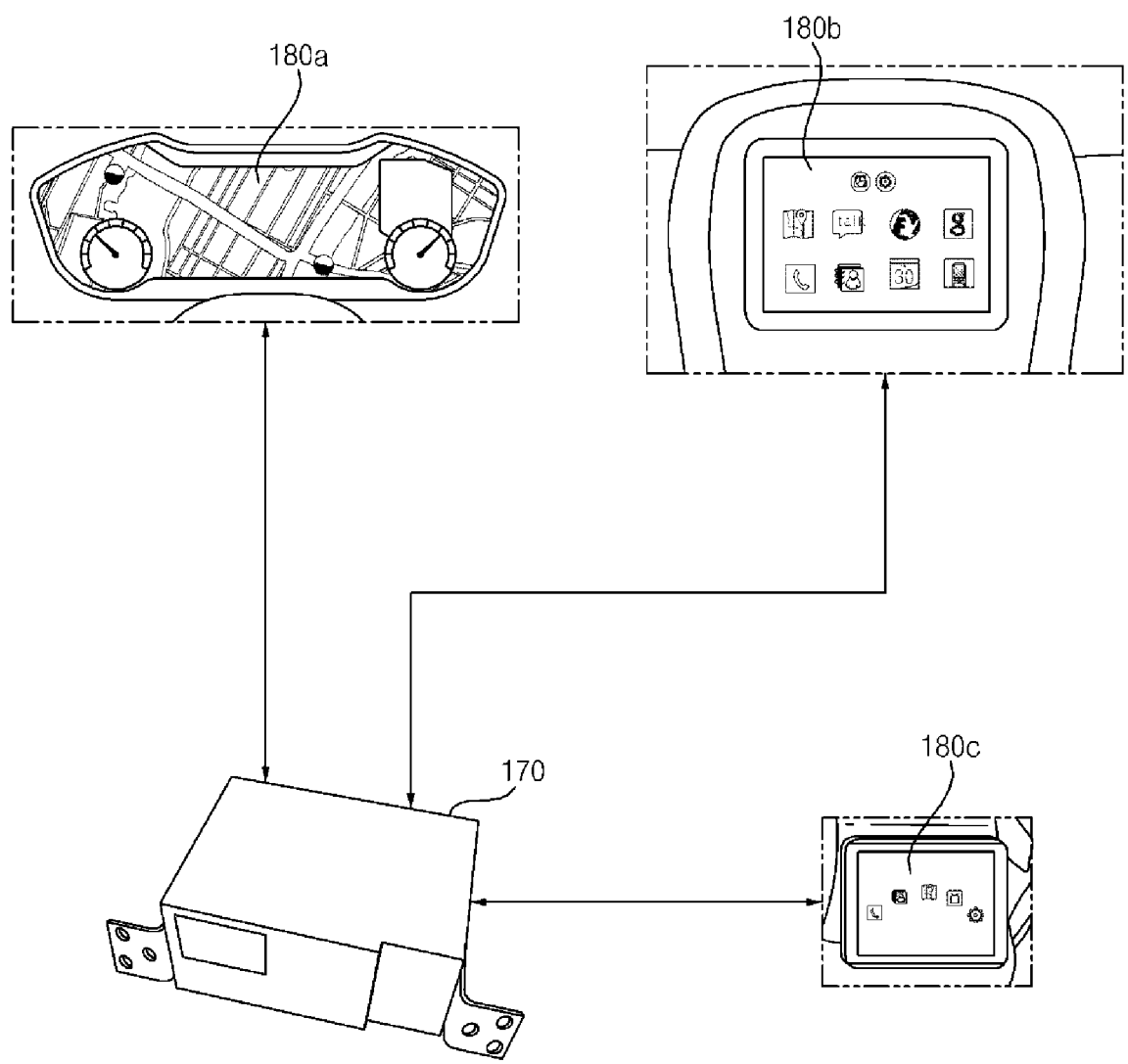
FIG. 2 is a view showing the external appearance of a display apparatus for vehicles according to an embodiment of the present disclosure.

FIG. 2 is a view showing the external appearance of a display apparatus for vehicles according to an embodiment of the present disclosure.

The display apparatus 100 for vehicles according to the embodiment of the present disclosure may include a plurality of displays 180a and 180b and a signal processing device 170 configured to perform signal processing in order to display images and information on the plurality of displays 180a and 180b.

The first display 180a, which is one of the plurality of displays 180a and 180b, may be a cluster display 180a configured to display a driving state and operation information, and the second display 180b may be an audio video navigation (AVN) display 180b configured to display vehicle driving information, a navigation map, various kinds of entertainment information, or an image.

The signal processing device 170 may have a processor 175 provided therein, and first to third virtual machines 520 to 540 may be executed by a hypervisor 505 in the processor 175.

The second virtual machine 530 may be operated for the first display 180a, and the third virtual machine 540 may be operated for the second display 180b.

Meanwhile, the first virtual machine 520 in the processor 175 may perform control such that a shared memory 508 based on the hypervisor 505 is set for transmission of identical data to the second virtual machine 530 and the third virtual machine 540. Consequently, the first display 180a and the second display 180b in the vehicle may display identical information or identical images in a synchronized state.

Meanwhile, the first virtual machine 520 in the processor 175 may receive and process wheel speed sensor data of the vehicle, and may transmit the processed wheel speed sensor data to at least one of the second virtual machine 530 and the third virtual machine 540. Consequently, at least one virtual machine may share the wheel speed sensor data of the vehicle.

Meanwhile, the display apparatus 100 for vehicles according to the embodiment of the present disclosure may further include a rear seat entertainment (RSE) display 180c configured to display driving state information, simple navigation information, various kinds of entertainment information, or an image.

The signal processing device 170 may further execute a fourth virtual machine (not shown), in addition to the first to third virtual machines 520 to 540, on the hypervisor 505 in the processor 175 to control the RSE display 180c.

Consequently, it is possible to control various displays 180a to 180c using a single signal processing device 170.

Meanwhile, some of the plurality of displays 180a to 180c may be operated based on a Linux Operating System (OS), and others may be operated based on a Web Operating System (OS).

The signal processing device 170 according to the embodiment of the present disclosure may perform control such that displays 180a to 180c configured to be operated under various operating systems also display identical information or identical images in a synchronized state.

Figure 3:
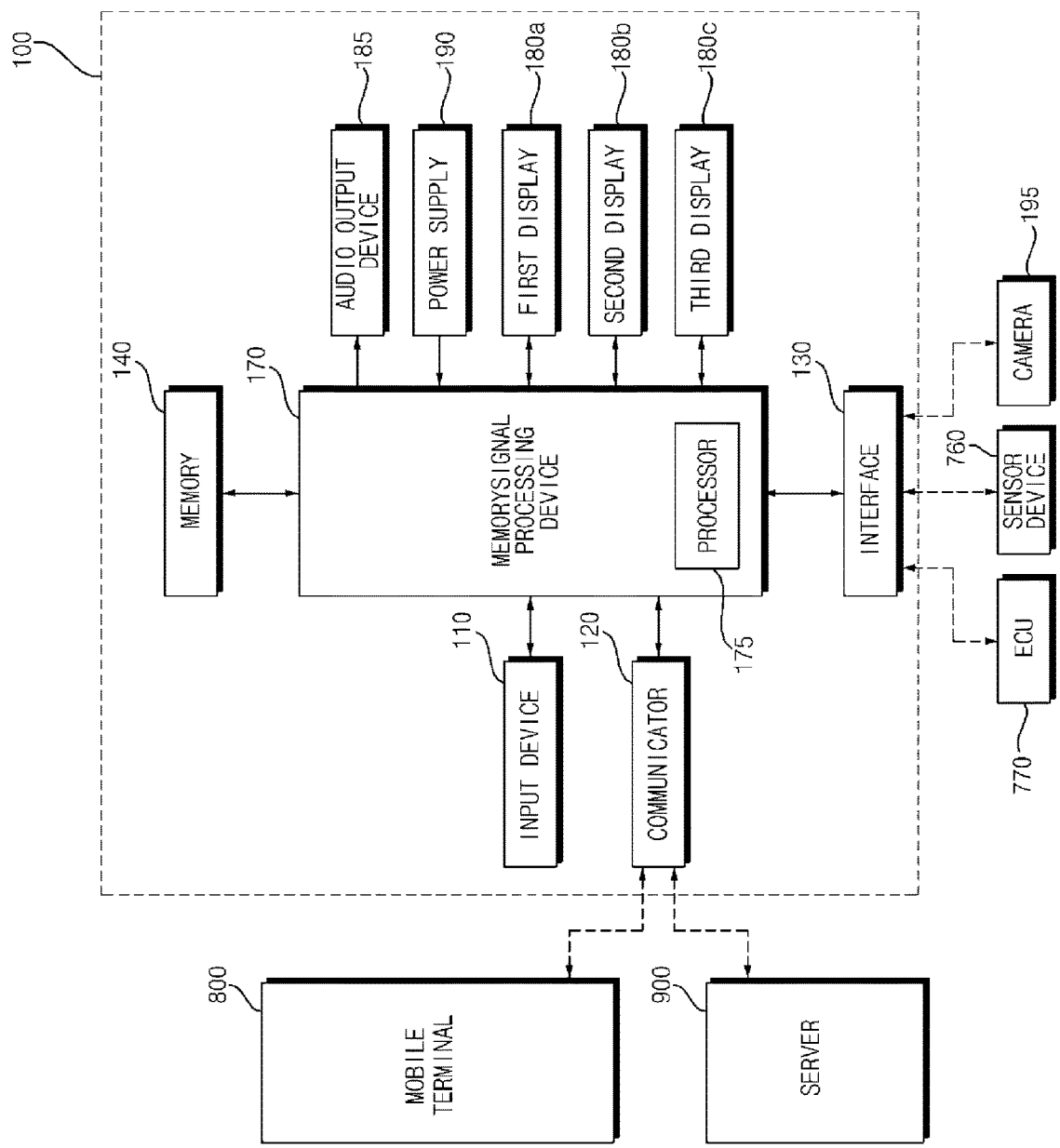
FIG. 3 illustrates an example of an internal block diagram of the display apparatus for vehicles of FIG. 2.

FIG. 3 illustrates an example of an internal block diagram of the display apparatus for vehicles according to the embodiment of the present disclosure.

Referring to the figure, the display apparatus 100 for vehicles according to the embodiment of the present disclosure may include an input device 110, a communicator 120, an interface 130, a memory 140, a signal processing device 170, a plurality of displays 180a to 180c, an audio output device 185, and a power supply 190.

The input device 110 may include a physical button or pad for button input or touch input.

Meanwhile, the input device 110 may include a microphone (not shown) for user voice input.

The communicator 120 may wirelessly exchange data with a mobile terminal 800 or a server 900.

In particular, the communicator 120 may wirelessly exchange data with a mobile terminal of a vehicle driver. Any of various data communication schemes, such as Bluetooth, Wi-Fi, WIFI Direct, and APIX, may be used as a wireless data communication scheme.

The communicator 120 may receive weather information and road traffic situation information, such as transport protocol expert group (TPEG) information, from the mobile terminal 800 or the server 900. To this end, the communicator 120 may include a mobile communication module (not shown).

The interface 130 may receive sensor information from an electronic control unit (ECU) 770 or a sensor device 750, and may transmit the received information to the signal processing device 170.

Here, the sensor information may include at least one of vehicle direction information, vehicle position information (global positioning system (GPS) information), vehicle angle information, vehicle velocity information, vehicle acceleration information, vehicle inclination information, vehicle forward/backward movement information, battery information, fuel information, tire information, vehicle lamp information, in-vehicle temperature information, and in-vehicle humidity information.

The sensor information may be acquired from a heading sensor, a yaw sensor, a gyro sensor, a position sensor, a vehicle forward/backward movement sensor, a wheel sensor, a vehicle velocity sensor, a car body inclination sensor, a battery sensor, a fuel sensor, a tire sensor, a steering-wheel-rotation-based steering sensor, an in-vehicle temperature sensor, or an in-vehicle humidity sensor. Meanwhile, the position module may include a GPS module configured to receive GPS information.

Meanwhile, the interface 130 may receive front-of-vehicle image data, side-of-vehicle image data, rear-of-vehicle image data, and obstacle-around-vehicle distance information from a camera 195 or lidar (not shown), and may transmit the received information to the signal processing device 170.

The memory 140 may store various data necessary for overall operation of the display apparatus 100 for vehicles, such as programs for processing or control of the signal processing device 170.

For example, the memory 140 may store data about the hypervisor and first to third virtual machines executed by the hypervisor in the processor 175.

The audio output device 185 may convert an electrical signal from the signal processing device 170 into an audio signal, and may output the audio signal. To this end, the audio output device 185 may include a speaker.

The power supply 190 may supply power necessary to operate components under control of the signal processing device 170. In particular, the power supply 190 may receive power from a battery in the vehicle.

The signal processing device 170 may control overall operation of each device in the display apparatus 100 for vehicles.

For example, the signal processing device 170 may include a processor 175 configured to perform signal processing for the displays 180*a* and 180*b*.

The processor 175 may execute the first to third virtual machines 520 to 540 on the hypervisor 505 (see FIG. 5) in the processor 175.

Among the first to third virtual machines 520 to 540 (see FIG. 5), the first virtual machine 520 may be called a server virtual machine, and the second and third virtual machines 530 and 540 may be called guest virtual machines.

The second virtual machine 530 may be operated for the first display 180*a*, and the third virtual machine 540 may be operated for the second display 180*b*.

For example, the first virtual machine 520 in the processor 175 may receive, process, and output vehicle sensor data, position information data, camera image data, audio data, or touch input data. Data processed only by a legacy virtual machine and data processed by the first virtual machine 520 may be distinguished from each other, whereby data processing may be efficiently performed. In particular, the first virtual machine 520 may process most of the data, whereby 1:N data sharing may be achieved.

As another example, the first virtual machine 520 may directly receive and process CAN communication data, audio data, radio data, USB data, and wireless communication data for the second and third virtual machines 530 and 540.

The first virtual machine 520 may transmit the processed data to the second and third virtual machines 530 and 540.

Consequently, only the first virtual machine 520, among the first to third virtual machines 520 to 540, may receive communication data and external input data, and may perform signal processing, whereby load in signal processing by the other virtual machines may be reduced and 1:N data communication may be achieved, and therefore synchronization at the time of data sharing may be achieved.

Meanwhile, the first virtual machine 520 may perform control such that data are written in the shared memory 508, whereby the second virtual machine 530 and the third virtual machine 540 share identical data.

For example, the first virtual machine 520 may perform control such that vehicle sensor data, the position information data, the camera image data, or the touch input data are written in the shared memory 508, whereby the second virtual machine 530 and the third virtual machine 540 share identical data. Consequently, 1:N data sharing may be achieved.

Eventually, the first virtual machine 520 may process most of the data, whereby 1:N data sharing may be achieved.

Meanwhile, the first virtual machine 520 in the processor 175 may perform control such that the shared memory 508 based on the hypervisor 505 is set in order to transmit identical data to the second virtual machine 530 and the third virtual machine 540.

That is, the first virtual machine 520 in the processor 175 may transmit identical data to the second virtual machine 530 and the third virtual machine 540 in a synchronized state using the shared memory 508 based on the hypervisor 505. Consequently, the plurality of displays 180*a* and 180*b* in the vehicle may display identical images in a synchronized state.

Meanwhile, the signal processing device 170 may process various signals, such as an audio signal, an image signal, and a data signal. To this end, the signal processing device 170 may be implemented in the form of a system on chip (SOC).

Figure 4:
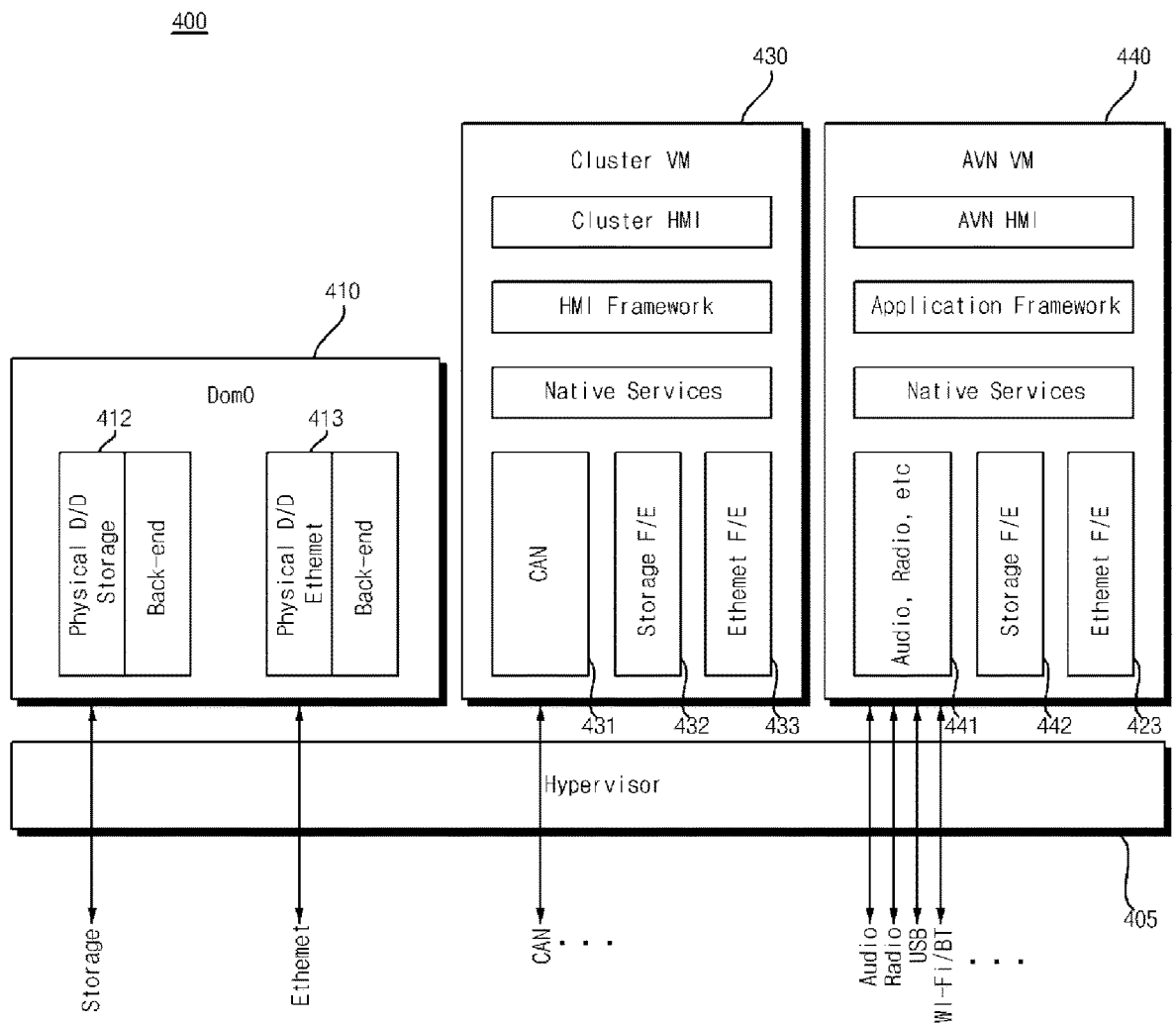
FIG. 4 is a view showing a system driven in a signal processing device related to the present disclosure.

FIG. 4 is a view showing a system driven in a signal processing device related to the present disclosure.

Referring to the figure, FIG. 4 is a view illustrating that virtual machines are used for the cluster display 180*a* and the AVN display 180*b*.

The system 400 driven in the signal processing device of FIG. 4 illustrates that a cluster virtual machine 430 and an AVN virtual machine 440 are executed through a hypervisor 405 in the processor 175.

Meanwhile, the system 400 driven in the signal processing device of FIG. 4 illustrates that a legacy virtual machine 410 is also executed on the hypervisor 405 in the processor 175.

The legacy virtual machine 410 may include an interface 412 for data communication with the memory 140 and an interface 413 for Ethernet communication.

Meanwhile, the cluster virtual machine 430 may include an interface 431 for CAN communication, an interface 432 for communication with the interface 412 of the legacy virtual machine 410, and an interface 433 for communication with the interface 413 of the legacy virtual machine 410.

Meanwhile, the AVN virtual machine 440 may include an interface 441 for input and output of audio data, radio data, USB data, and wireless communication data, an interface 442 for communication with the interface 412 of the legacy virtual machine 410, and an interface 443 for communication with the interface 413 of the legacy virtual machine 410.

In the system 400, there is a disadvantage in that CAN communication data are input and output only in the cluster virtual machine 430, whereby the CAN communication data cannot be utilized in the AVN virtual machine 440.

Also, in the system 400 of FIG. 4, there is a disadvantage in that audio data, radio data, USB data, and wireless communication data are input and output only in the AVN virtual machine 440, whereby these data cannot be utilized in the cluster virtual machine 430.

Meanwhile, there is a disadvantage in that the cluster virtual machine 430 and the AVN virtual machine 440 must include the interfaces 431 and 432 and the interfaces 441 and 442, respectively, for memory data and Ethernet communication data input and output in the legacy virtual machine 410.

Therefore, the present disclosure proposes a scheme for improving the system of FIG. 4. That is, unlike FIG. 4, virtual machines are classified into a server virtual machine and guest virtual machines such that various memory data and communication data are input and output not in the guest virtual machines but in the server virtual machine. This will be described with reference to FIG. 5 and subsequent figures.

Figure 5:
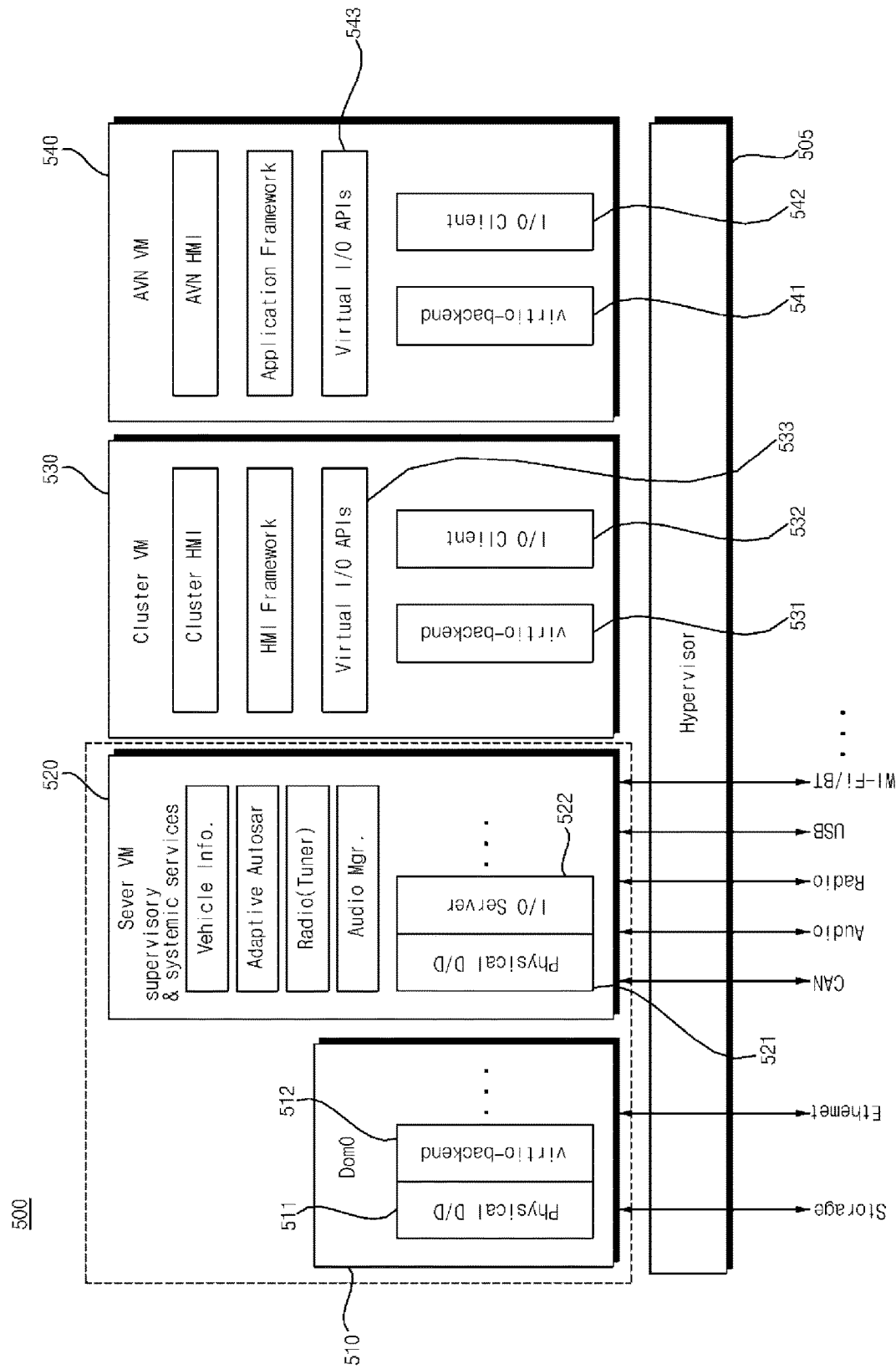
FIG. 5 is a view showing an example of a system driven in a signal processing device according to an embodiment of the present disclosure.

FIG. 5 is a view showing an example of a system driven in a signal processing device according to an embodiment of the present disclosure.

Referring to the figure, the system 500 of FIG. 5 illustrates that the first virtual machine 520, which is a server virtual machine, the second virtual machine 530, which is a guest virtual machine, and the third virtual machine 540, which is a guest virtual machine, are executed on the hypervisor 505 in the processor 175 of the signal processing device 170.

The second virtual machine 530 may be a virtual machine for the cluster display 180*a*, and the third virtual machine 540 may be a virtual machine for the AVN display 180*b*.

That is, the second virtual machine 530 and the third virtual machine 540 may be operated for image rendering of the cluster display 180*a* and the AVN display 180*b*, respectively.

Meanwhile, the system 50 driven in the signal processing device 170 of FIG. 5 illustrates that a legacy virtual machine 510 is also executed on the hypervisor 505 in the processor 175.

The legacy virtual machine 510 may include an interface 511 for data communication and Ethernet communication with the memory 140.

Meanwhile, the legacy virtual machine 510 may further include a virtio-backend interface 512 for data communication with the second and third virtual machines 530 and 540.

The first virtual machine 520 may include an interface 521 for input and output of audio data, radio data, USB data, and wireless communication data and an input and output server interface 522 for data communication with the guest virtual machines.

That is, the first virtual machine 520, which is a server virtual machine, may provide inputs/outputs (I/O) difficult to virtualize with standard virtualization technology (VirtIO) to a plurality of guest virtual machines, such as the second and third virtual machines 530 and 540.

Meanwhile, the first virtual machine 520, which is a server virtual machine, may control radio data and audio data at a supervisor level, and may provide the data to a plurality of guest virtual machines, such as the second and third virtual machines 530 and 540.

Meanwhile, the first virtual machine 520, which is a server virtual machine, may process vehicle data, sensor data, and surroundings-of-vehicle information, and may provide the processed data or information to a plurality of guest virtual machines, such as the second and third virtual machines 530 and 540.

Meanwhile, the first virtual machine 520 may provide supervisory services, such as processing of vehicle data and audio routing management.

Next, the second virtual machine 530 may include an input and output client interface 532 for data communication with the first virtual machine 520 and APIs 533 configured to control the input and output client interface 532.

In addition, the second virtual machine 530 may include a virtio-backend interface for data communication with the legacy virtual machine 510.

The second virtual machine 530 may receive memory data by communication with the memory 140 and Ethernet data by Ethernet communication from the virtio-backend interface 512 of the legacy virtual machine 510 through the virtio-backend interface.

In addition, the third virtual machine 540 may include a virtio-backend interface for data communication with the legacy virtual machine 510.

Next, the third virtual machine 540 may include an input and output client interface 542 for data communication with the first virtual machine 520 and APIs 543 configured to control the input and output client interface 542.

The third virtual machine 540 may receive memory data by communication with the memory 140 and Ethernet data by Ethernet communication from the virtio-backend interface 512 of the legacy virtual machine 510 through the virtio-backend interface.

Meanwhile, the legacy virtual machine 510 may be provided in the first virtual machine 520, unlike FIG. 5.

In the system 500, CAN communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Also, in the system 500 of FIG. 5, audio data, radio data, USB data, and wireless communication data are input and output only in the first virtual machine 520, but may be provided to a plurality of guest virtual machines, such as the second and third virtual machines 530 and 540, through data processing in the first virtual machine 520. Consequently, 1:N data communication by processing of the first virtual machine 520 may be achieved.

Meanwhile, in the system 500 of FIG. 5, the second and third virtual machines 530 and 540 may be operated based on different operating systems.

For example, the second virtual machine 530 may be operated based on a Linux OS, and the third virtual machine 540 may be operated based on a Web OS.

In the first virtual machine 520, the shared memory 508 based on the hypervisor 505 is set for data sharing, even though the second and third virtual machines 530 and 540 are operated based on different operating systems. Even though the second and third virtual machines 530 and 540 are operated based on different operating systems, therefore, identical data or identical images may be shared in a synchronized state. Eventually, the plurality of displays 180a and 180b may display identical data or identical images in a synchronized state.

Figure 6:
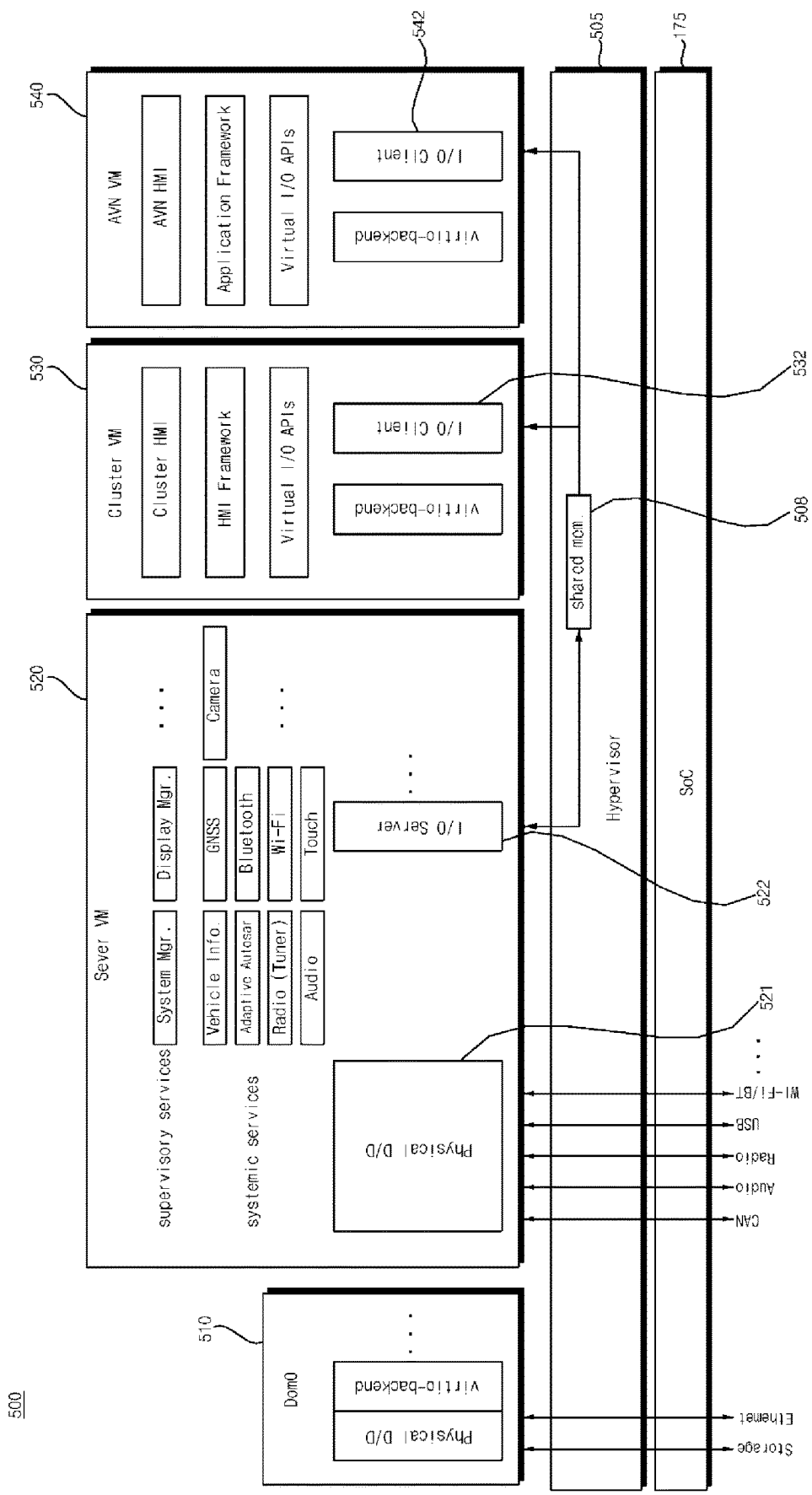
FIG. 6 is a view referred to in the description of operation of the system driven in the signal processing device according to the embodiment of the present disclosure.

FIG. 6 is a view referred to in the description of operation of the system driven in the signal processing device according to the embodiment of the present disclosure, and FIGS. 7A to 15 are views referred to in the description of FIG. 5 or 6.

First, in the system 500 of FIG. 6, the processor 175 in the signal processing device 170 executes the first to third virtual machines 520 to 540 on the hypervisor 505 in the processor 175, and the first virtual machine 520 in the processor 175 performs control such that the shared memory 508 based on the hypervisor 505 is set for transmission of identical data to the second and third virtual machines 530 and 540.

For example, identical image data may be illustrated as identical data. Consequently, the plurality of displays 180a and 180b in the vehicle may display identical images in a synchronized state.

Meanwhile, in the system 500 of FIG. 6, the processor 175 in the signal processing device 170 executes the first to third virtual machines 520 to 540 on the hypervisor 505 in the processor 175, and the first virtual machine 520 in the processor 175 may transmit identical data to the second and third virtual machines 530 and 540 in a synchronized state using the shared memory 508 based on the hypervisor 505.

For example, CAN communication data, audio data, radio data, USB data, wireless communication data, position information data, or touch data may be illustrated as identical data. Consequently, the plurality of displays 180a and 180b in the vehicle may display identical data in a synchronized state.

Meanwhile, the first virtual machine 520 in the processor 175 may receive and process position information data variable due to movement, and may provide the processed data to the second virtual machine 530 or the third virtual machine 540. Consequently, not 1:1 data communication but 1:N data communication using the shared memory may be performed between the virtual machines.

Meanwhile, the second virtual machine 530 and the third virtual machine 540 may be driven by different operating systems. Even though the plurality of virtual machines is driven by different operating systems, therefore, it is possible to perform high-speed data communication.

Meanwhile, although not shown in FIG. 6, the legacy virtual machine 510 may transmit memory data from the memory 140 and Ethernet data by Ethernet communication to the second and third virtual machines 530 and 540 in a synchronized state using the shared memory 508 based on the hypervisor 505. That is, it is possible to perform 1:N data communication with respect to the memory data or the Ethernet data, whereby it is possible to transmit identical data in a synchronized state.

Figure 7A:
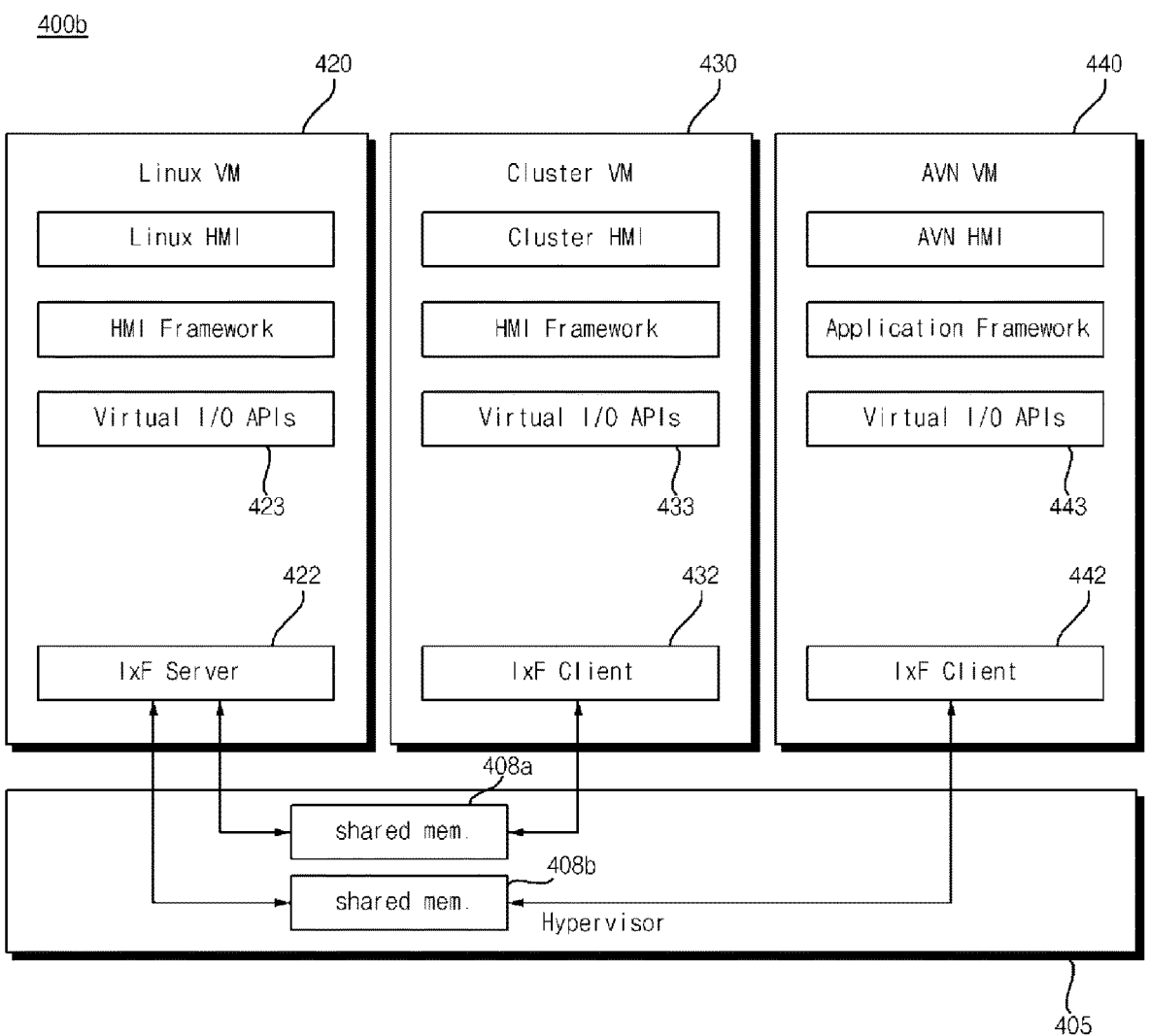
FIGS. 7A to 15 are views referred to in the description of FIG. 5 or 6.

FIG. 7A illustrates that three virtual machines 420, 430, and 440 are operated in a system 400b.

Referring to the figure, the first virtual machine 420, which is a Linux-based virtual machine, may include an input and output server interface 422 for data transmission, and the second virtual machine 430 and the third virtual machine 440 may include input and output client interfaces 432 and 442 for data communication with the input and output server interface 422, respectively.

For example, the first virtual machine 420 must set a first shared memory 408a in a hypervisor 405 in order to transmit first data to the second virtual machine 430, and the first virtual machine 420 must set a second shared memory 408b different from the first shared memory 408a in the hypervisor 405 in order to transmit identical first data to the third virtual machine 440.

In the case in which identical first data are transmitted, there is a disadvantage in that resources are wasted and synchronization is not easy in the case in which an additional shared memory is used, as shown in FIG. 7A.

Figure 7B:
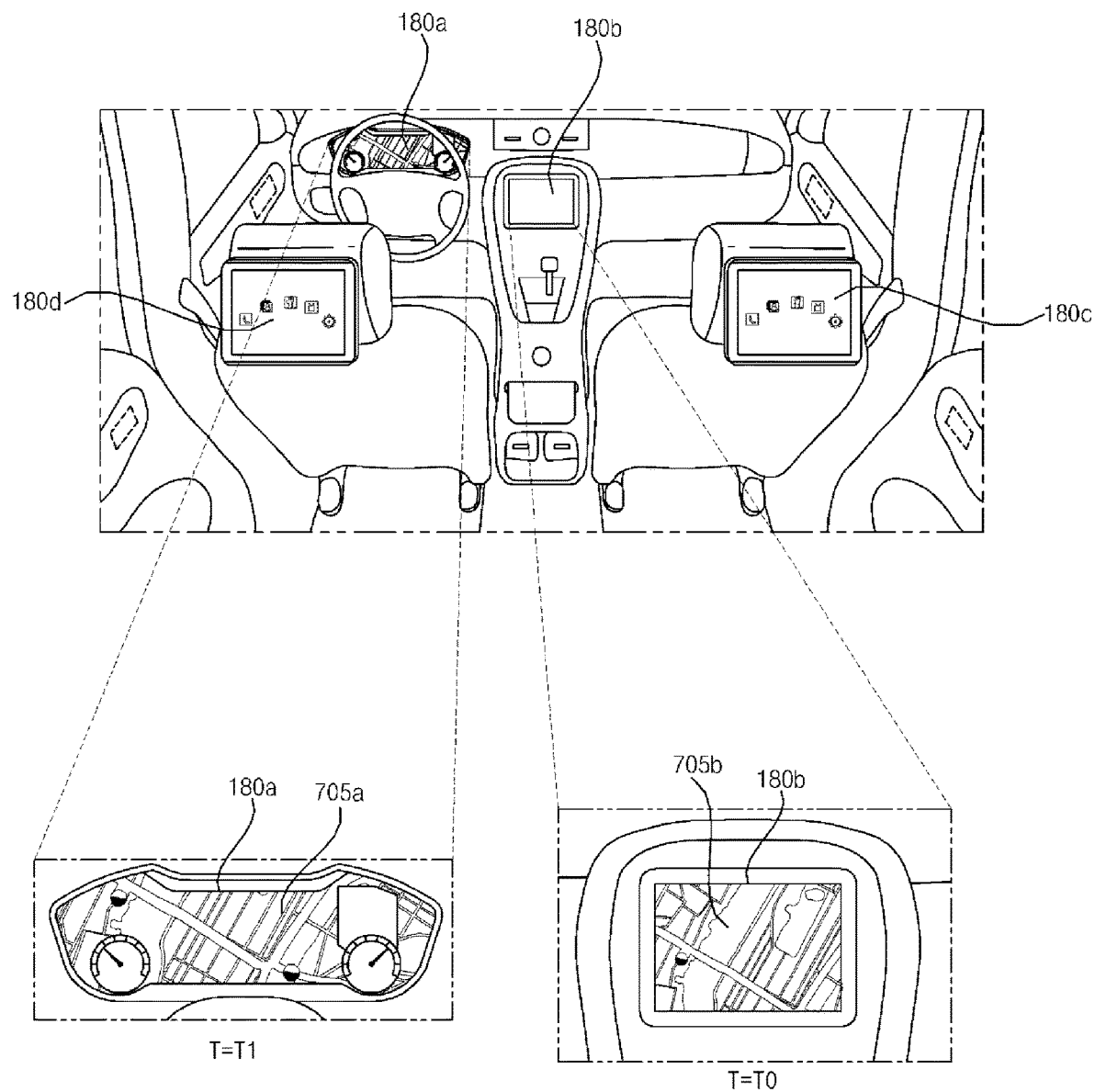

FIG. 7B illustrates that, by the system 400b of FIG. 7A, the second virtual machine 430 displays image data received through the first shared memory 408a on the first display 180a, and the third virtual machine 440 displays image data received through the second shared memory 408b on the second display 180b.

FIG. 7B illustrates that an image 705a displayed on the first display 180a and an image 705b displayed on the second display 180b are not synchronized with each other and that the image 705b displayed on the second display 180b corresponds to a more previous frame than the image 705a displayed on the first display 180a.

When the first virtual machine 420 transits identical image data, as described above, synchronization cannot be performed at the time of display of the image, as shown in FIG. 7B, in the case in which an additional shared memory is used, as shown in FIG. 7A.

In order to solve this problem, the present disclosure proposes a scheme for assigning a single shared memory at the time of transmission of identical data. Consequently, 1:N data communication is performed, whereby synchronized data transmission is achieved.

Figure 8:
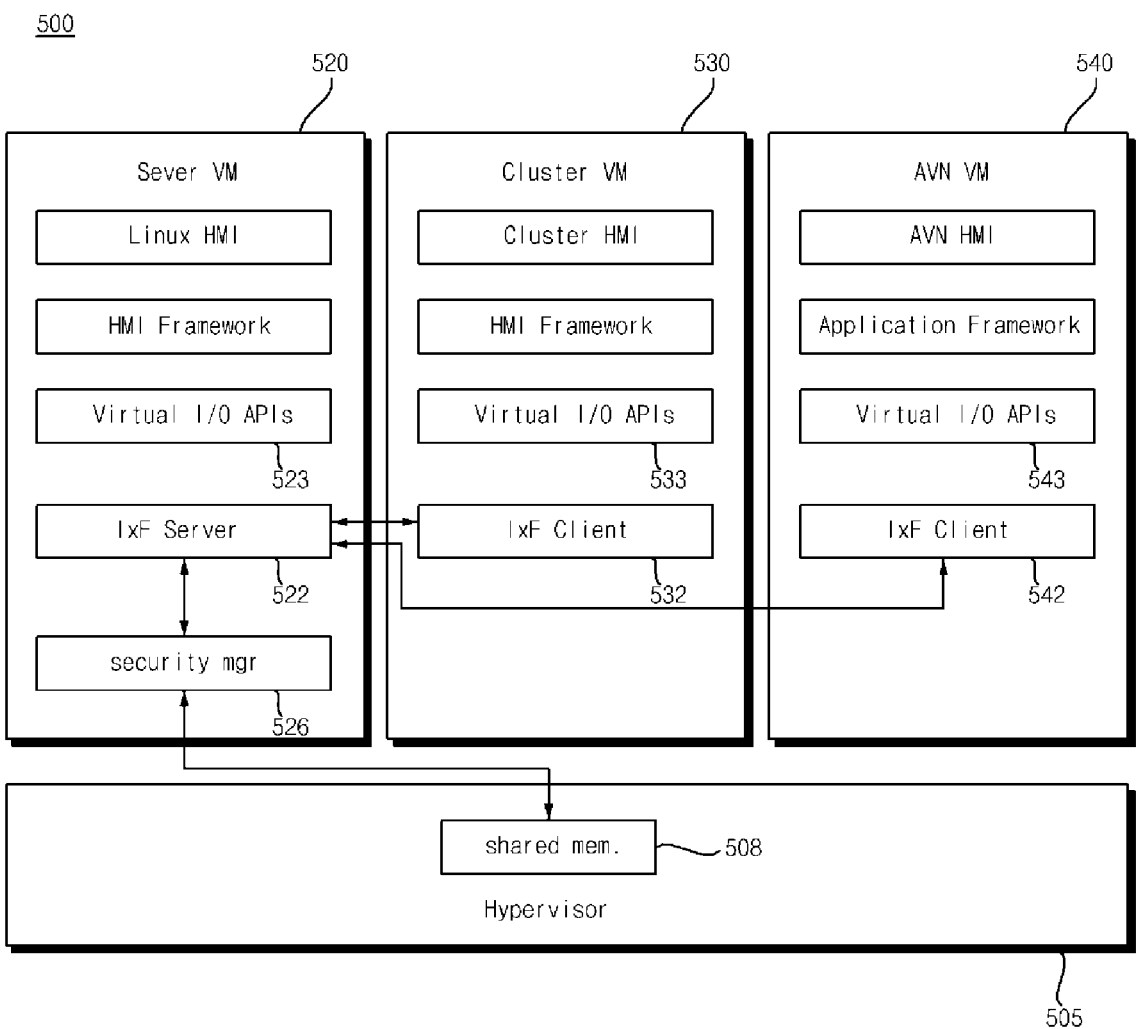

FIG. 8 illustrates that the first to third virtual machines 520 to 540 are executed on the hypervisor 505 in the processor 175 of the system 500 according to the present disclosure and that the first virtual machine 520 in the processor 175 performs control such that the shared memory 508 based on the hypervisor 505 is set in order to transmit identical data to the second virtual machine 530 and the third virtual machine 540.

Consequently, the first display 180a and the second display 180b in the vehicle may display identical images in a synchronized state.

Meanwhile, high-speed data communication may be performed between the plurality of virtual machines. Furthermore, high-speed data communication may be performed even though the plurality of virtual machines is driven by different operating systems.

Meanwhile, the first virtual machine 520 in the processor 175 may not allocate memories corresponding in number to the virtual machines but may use a single shared memory 508, not memory allocation when transmitting the data processed by the first virtual machine 520 to another virtual machine. Consequently, 1:N data communication using the shared memory 508, not 1:1 data communication, may be performed between the virtual machines.

Meanwhile, the first virtual machine 520 in the processor 175 may include an input and output server interface 522 and a security manager 526.

Meanwhile, the second virtual machine 530 and the third virtual machine 540 may include input and output client interfaces 532 and 542, respectively. Consequently, high-speed data communication between the plurality of virtual machines may be performed using the input and output server interface 522 and the input and output client interfaces 532 and 542.

The input and output server interface 522 in the first virtual machine 520 may receive requests for transmission of identical data from the input and output client interfaces 532 and 542 in the second virtual machine 530 and the third virtual machine 540, and may transmit shared data to the shared memory 508 through the security manager 526 based thereon.

Figure 9A:
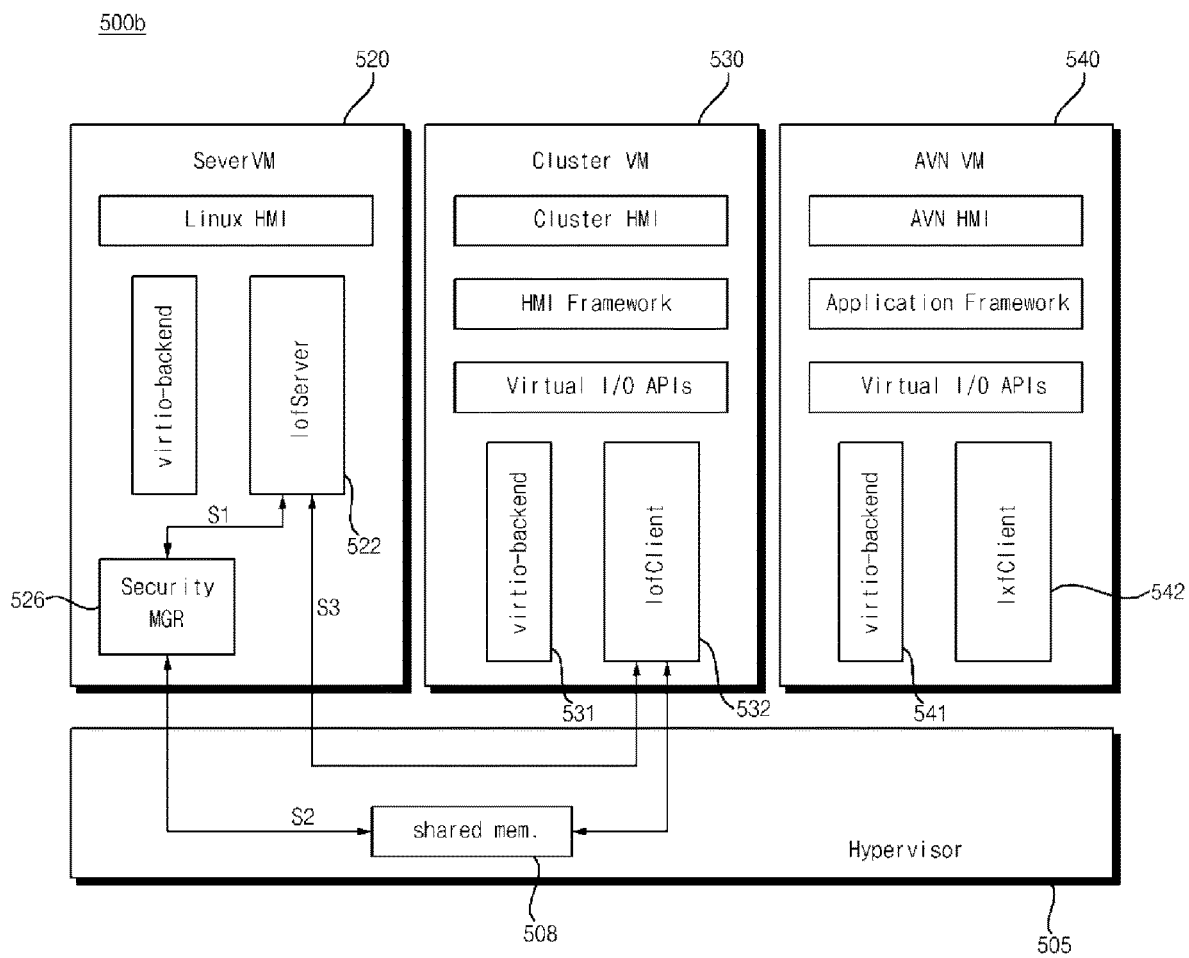

FIG. 9A is a view illustrating transmission of shared data in more detail.

Referring to the figure, in order to transmit shared data, the input and output server interface 522 in the first virtual machine 520 transmits a request for allocation of the shared memory 508 to the security manager 526 (S1).

Subsequently, the security manager 526 may allocate the shared memory 508 using the hypervisor 505 (S2), and may write shared data in the shared memory 508.

Meanwhile, the input and output client interfaces 532 and 542 may transmit a request for connection to the input and output server interface 522 after allocation of the shared memory 508 (S3).

Meanwhile, the input and output server interface 522 transmits information regarding shared memory 508 including key data to the input and output client interfaces 532 and 542 after allocation of the shared memory 508 (S4). At this time, the key data may be private data for data access.

Meanwhile, the first virtual machine 520 in the processor 175 may transmit information regarding the shared memory 508 to the second virtual machine 530 and the third virtual machine 540 after setting of the shared memory 508.

The input and output client interfaces 532 and 542 may access the shared memory 508 based on the received key data (S5), and may copy the shared data from the shared memory 508.

Consequently, the second virtual machine 530 and the third virtual machine 540 may access the shared memory 508, and may eventually share the shared data.

For example, in the case in which the shared data are image data, the second virtual machine 530 and the third virtual machine 540 may share the image data, and eventually the plurality of displays 180a and 180b in the vehicle may display identical shared images in a synchronized state.

Figure 9B:
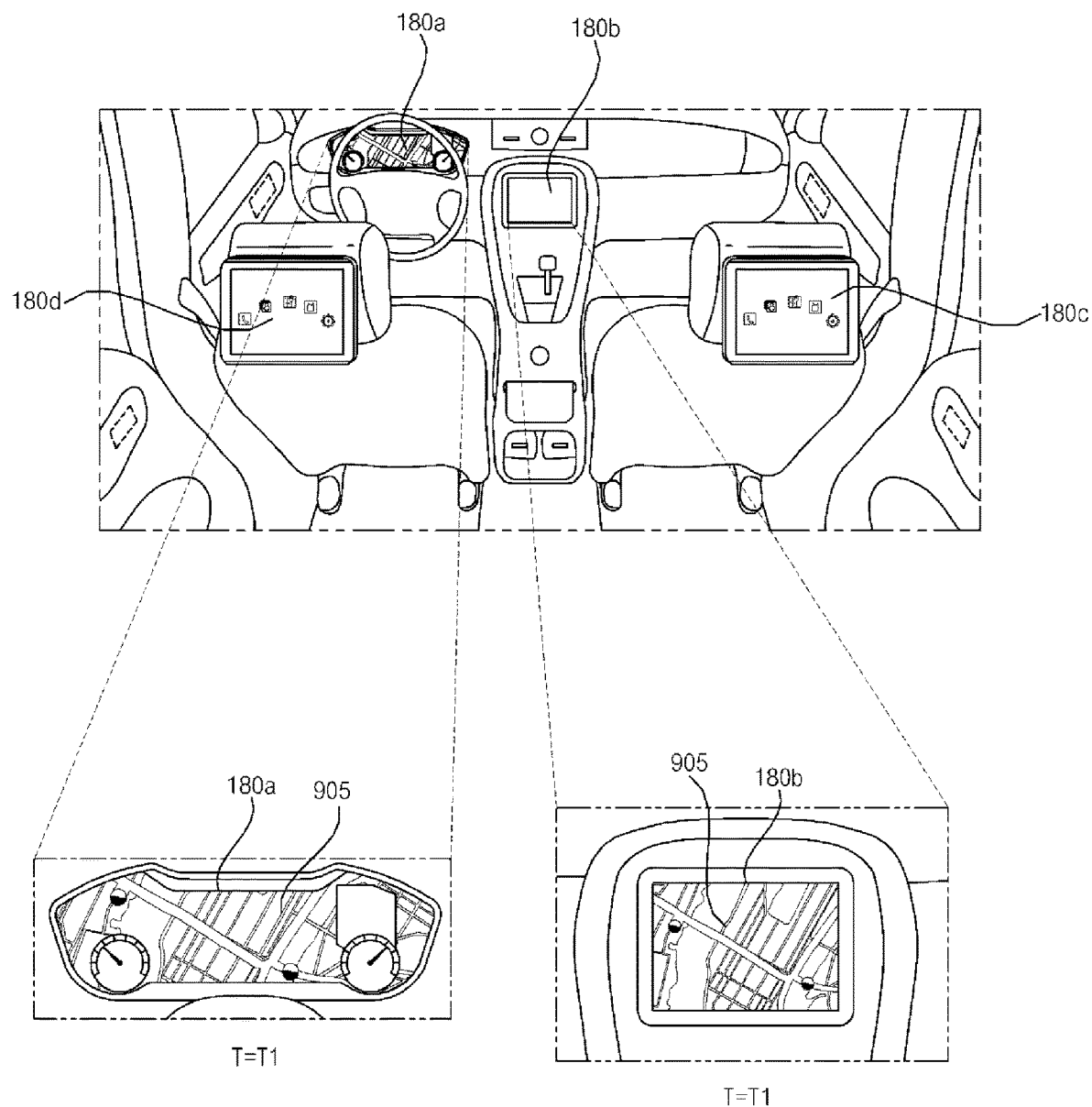

FIG. 9B illustrates that, by the system 500b of FIG. 9A, the second virtual machine 530 displays image data received through the shared memory 508 on the first display 180a, and the third virtual machine 540 displays image data received through the shared memory 508 on the second display 180b.

FIG. 9B illustrates that an image 905 displayed on the first display 180a and an image 905 displayed on the second display 180b are synchronized, whereby identical images are displayed.

That is, image data processed by the first virtual machine 520 in the processor 175 are transmitted to the second virtual machine 530 and the third virtual machine 540 through the shared memory 508, and the first image 905 displayed on the first display 180a and the second image 905 displayed on the second display 180b based on the image data may be identical. Consequently, the plurality of displays 180a and 180b in the vehicle may display identical images in a synchronized state. In addition, high-speed data communication between the plurality of virtual machines may be performed.

Figure 10:
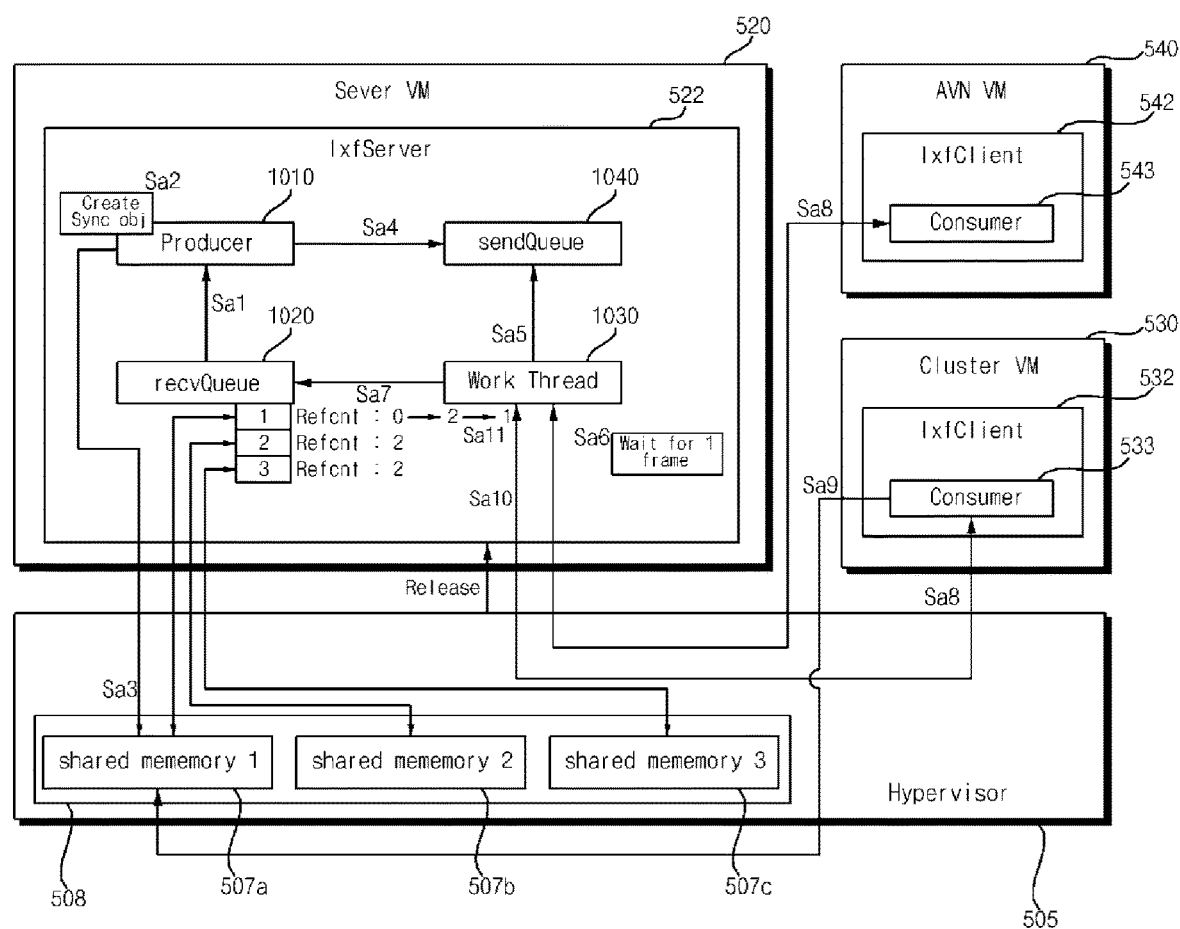

FIG. 10 is a view showing the output server interface 522 of FIG. 8 in detail.

Referring to the figure, a plurality of buffers 507a, 507b, and 507c may be set in the shared memory 508.

Meanwhile, the input and output client interfaces 532 and 542 in the second virtual machine 530 and the third virtual machine 540 may include consumers 533 and 543, respectively.

Meanwhile, the input and output server interface 522 in the first virtual machine 520 may include a producer 1010 configured to create a synchronization object for graphical synchronization, a recvQueue 1020 configured to manage, particularly receive, a queue, a WorkThread 1030 configured to manage a queue and to control operation of the queue, and a sendQueue 1040 configured to manage, particularly transmit, a queue.

First, the producer 1010 receives information regarding the index of an empty index, among the plurality of buffers 507a, 507b, and 507c in the shared memory 508, from the recvQueue 1020 (Sa1). For example, in the case in which the first buffer 507a, among the plurality of buffers 507a, 507b, and 507c, is empty, information regarding the first buffer 507a is received (Sa1).

In particular, the producer 1010 may receive information regarding the first buffer 507a having a reference count refcnt of 0 from the recvQueue 1020.

Next, the producer 1010 creates a synchronization object for graphical synchronization in order to perform writing in the first buffer 507a (Sa2).

Next, the producer 1010 writes data about the created synchronization object in the first buffer 507a in the shared memory 508 (Sa3).

Next, the producer 1010 queues information regarding the first buffer 507a, i.e. a buffer index, to the sendQueue 1040 (Sa4).

Next, in the case in which data are input to the sendQueue 1040, which is periodically monitored, the WorkThread 1030 senses and receives or reads the data (Sa5).

For example, in the case in which information regarding the first buffer 507a is input to the sendQueue 1040, which is monitored, the WorkThread 1030 receives the information.

Meanwhile, the WorkThread 1030 waits until a frame about the created synchronization object is completely drawn (Sa6).

Next, the WorkThread 1030 increases the reference count refcnt of the buffer corresponding to the first buffer 507a by the number of consumers or the number of input and output client interfaces (Sa7).

For example, since the number of consumers 533 and 543 or the number of input and output client interfaces 532 and 542 is two in the figure, the reference count refcnt of the buffer corresponding to the first buffer 507a is increased from 0 to 2.

Next, the WorkThread 1030 transmits the buffer index to the consumers 533 and 543 (Sa8). For example, information corresponding to the first buffer 507a is transmitted (Sa8).

Next, the consumers 533 and 543 access the first buffer 507a in the shared memory 508 using the received buffer index to copy data (Sa9).

Next, the consumers 533 and 543 return the buffer index to the producer 1010 or the WorkThread 1030 after completion of data copying (Sa10).

Next, the producer 1010 reduces the reference count refcnt of the first buffer 507a by 1 based on information or a buffer index received after completion of data copying for each of the consumers 533 and 543.

For example, in the case in which the first consumer 533 completes data copying, the reference count refcnt of the first buffer 507a is reduced from 2 to 1.

Subsequently, in the case in which the second consumer 543 completes data copying, the reference count refcnt of the first buffer 507a is reduced from 1 to 0.

Meanwhile, in the case in which the reference count refcnt of the first buffer 507a is 0, the buffer may be used by the producer 1010.

Similarly, first frame data may be shared using the first buffer 507a, then second frame data may be shared using the second buffer 507b, then third frame data may be shared using the third buffer 507c, and then fourth frame data may be shared using the first buffer 507a again.

That is, the input and output server interface 522 may receive information regarding the empty first buffer 507a in the shared memory 508, may write the first data in the first buffer 507a in the shared memory 508, and may transmit buffer information of the first buffer 507a to the input and output client interfaces 532 and 542 in the second virtual machine 530 and the third virtual machine 540.

In particular, the reference count of the first buffer 507a may be changed in a first direction (e.g. the reference count being increased) based on writing of the first data in the first buffer 507a, and in case in which copying of the first data to the first buffer 507a is completed, the reference count of the first buffer 507a may be changed in a second direction, which is opposite the first direction, (e.g. the reference count being decreased).

For example, the consumers 533 and 543 in the input and output client interfaces 532 and 542 in the second virtual machine 530 and the third virtual machine 540 may change the reference count of the first buffer 507a in the first direction (e.g. the reference count being increased) based on writing of the first data in the first buffer 507a.

Meanwhile, in case in which copying of the first data to the first buffer 507a is completed, the producer 1010 in the input and output server interface 522 in the first virtual machine 520 may change the reference count of the first buffer 507a in the second direction, which is opposite the first direction, (e.g. the reference count being decreased). After completion of copying, therefore, new data may be written in the first buffer 507a.

Meanwhile, the first virtual machine 520 may write first frame data to third frame data in the first buffer 507a to the third buffer 507c, respectively, and the input and output client interfaces 532 and 542 in the second virtual machine 530 and the third virtual machine 540 may sequentially copy the first frame data to the third frame data from the first buffer 507a to the third buffer 507c.

Meanwhile, after the input and output client interface 542 in the third virtual machine 540 copying the first frame data from the first buffer 507a is completed, the second virtual machine 530 may copy the second frame data from the second buffer 507b. Consequently, synchronization between the second virtual machine 530 and the third virtual machine 540 may be performed at the time of data sharing.

Figure 11:
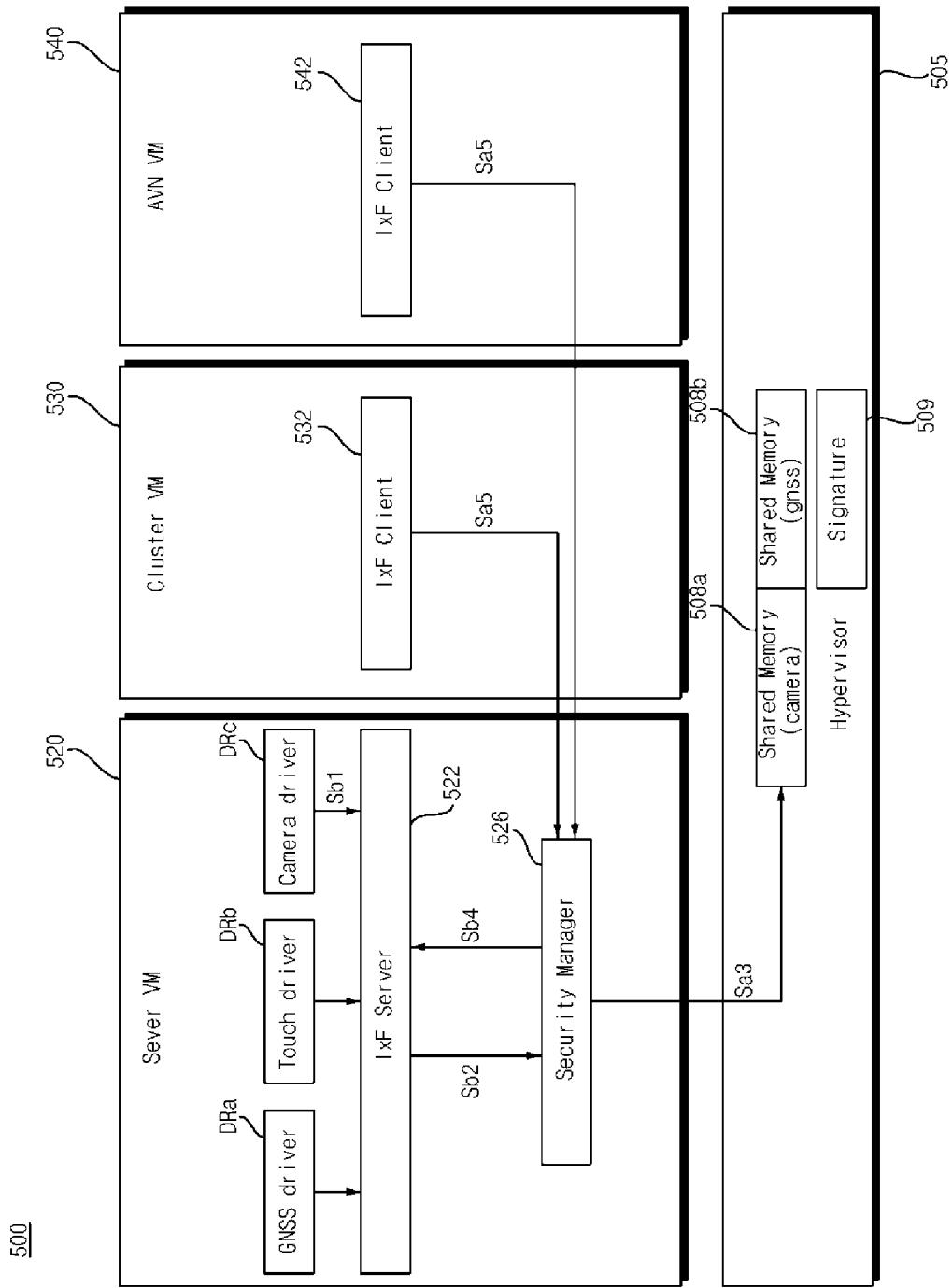

FIG. 11 a view illustrating that various drivers DRa, DRb, and DRc are provided in the first virtual machine 520.

Referring to the figure, the first virtual machine 520 may include a position information driver DRa configured to process position information, a touch driver DRb configured to process touch input, and a camera driver DRc configured to process an image from the camera.

Consequently, the first virtual machine 520 may set the shared memory based on the hypervisor 505 for each of the position information driver DRa, the touch driver DRb, and the camera driver DRc.

Meanwhile, the input and output server interface 522 may set a first shared memory 508a for transmission of image data from the camera driver DRc, and may set a second shared memory 508b for transmission of position information from the position information driver DRa.

Meanwhile, key data of the first shared memory 508a and key data of the second shared memory 508b may be transmitted to the second virtual machine 530 and the third virtual machine 540, and the second virtual machine 530 and the third virtual machine 540 may access the first shared memory 508a and the second shared memory 508b based on the key data of the first shared memory 508a and the key data of the second shared memory 508b.

In the figure, the case in which data from the position information driver DRa and data from the camera driver DRc are shared is illustrated, and therefore two shared memories 508a and 508b are illustrated as the shared memories based on the hypervisor 505.

Since a shared memory is set for each of different kinds of shared data, as described above, it is possible to prevent data confusion at the time of data sharing and to perform high-speed data communication between the plurality of virtual machines.

Meanwhile, when different kinds of shared data are shared, the security manager 526 may create key data information for data access, and may create and register virtual machine information, information for each piece of equipment, allocated memory address information, buffer index information, and the created key data information in the form of a table.

Meanwhile, the input and output client interfaces 532 and 542 in the second virtual machine 530 and the third virtual machine 540 may be connected to the security manager 526, may request and receive key data with reference to the table in the security manager 526, and may access a corresponding one of the shared memories using the received key data.

Meanwhile, in the case in which data from the camera driver DRc are shared through the first shared memory 508a and in the case in which data from the position information driver DRa are shared through the second shared memory 508b, the virtual machine information in one case and the virtual machine information in the other case are identical to each other, but the information for each piece of equipment, the allocated memory address information, the buffer index information, and the created key data information in one case and the information for each piece of equipment, the allocated memory address information, the buffer index information, and the created key data information in the other case are different from each other. Consequently, it is possible to prevent data confusion at the time of sharing of different kinds of data and to perform high-speed data communication between the plurality of virtual machines.

Figure 12A:
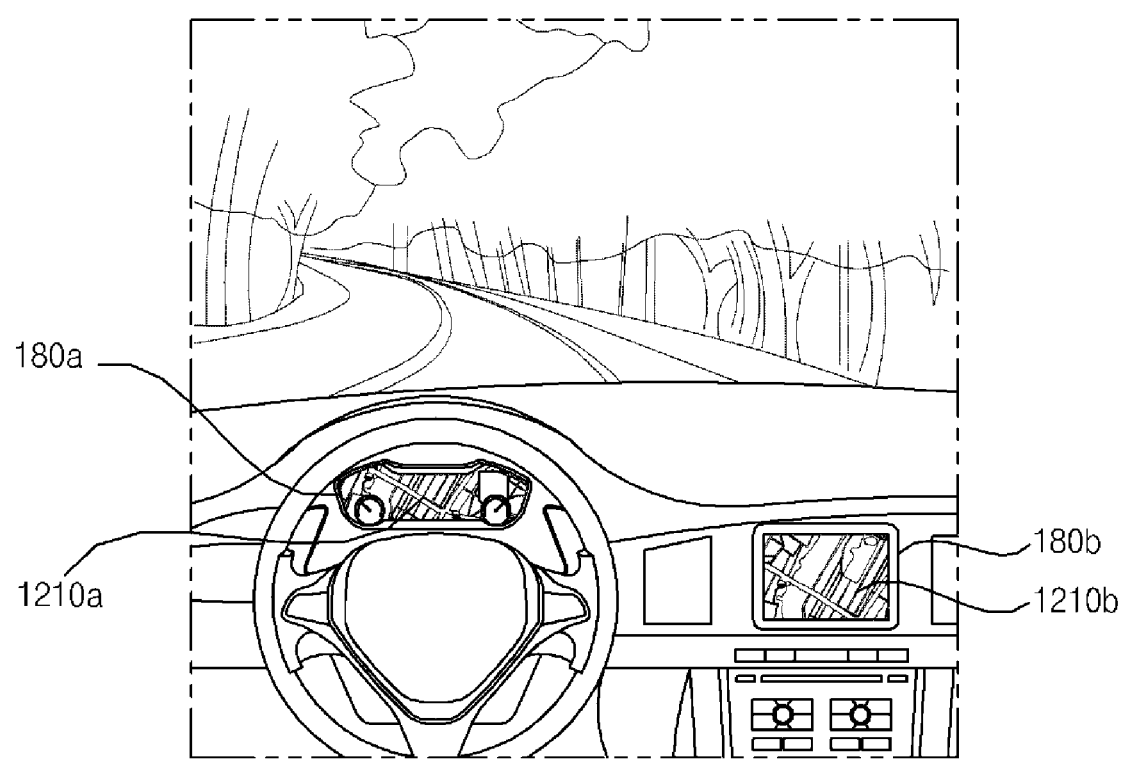

FIG. 12A illustrates that identical images 1210a and 1210b are displayed respectively on the first display 180a and the second display 180b in the vehicle.

For example, in the case in which the second virtual machine 530 is operated for rendering of the first display 180a and the third virtual machine 540 is operated for rendering of the second display 180b, 1:N data communication by the first virtual machine 520 is performed, whereby synchronized images are displayed, as shown in the figure.

FIG. 12A illustrates that identical images 1210a, 1210b, 1210c, and 1210d are displayed respectively on the first display 180a, the second display 180b, the third display 180c, and the fourth display 180d in the vehicle.

For example, in the case in which the second virtual machine 530 is operated for rendering of the first display 180a, the third virtual machine 540 is operated for rendering of the second display 180b, the fourth virtual machine (not shown) is operated for rendering of the third display 180c, and a fifth virtual machine (not shown) is operated for rendering of the fourth display 180d, 1:N data communication by the first virtual machine 520 is performed, whereby synchronized images are displayed, as shown in the figure.

Figure 12B:
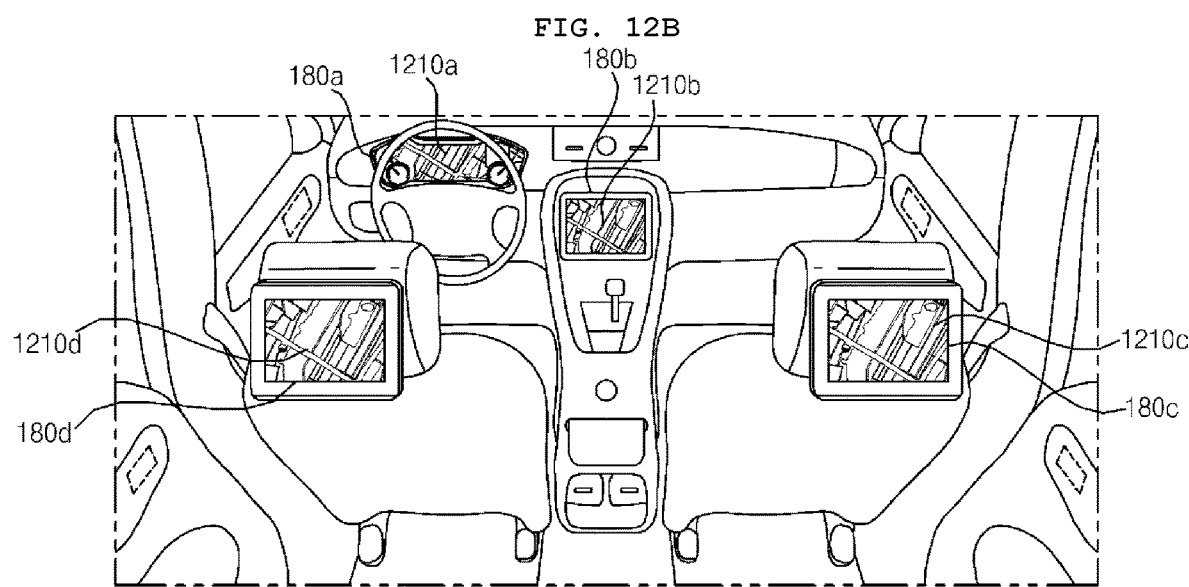
Figure 12C:
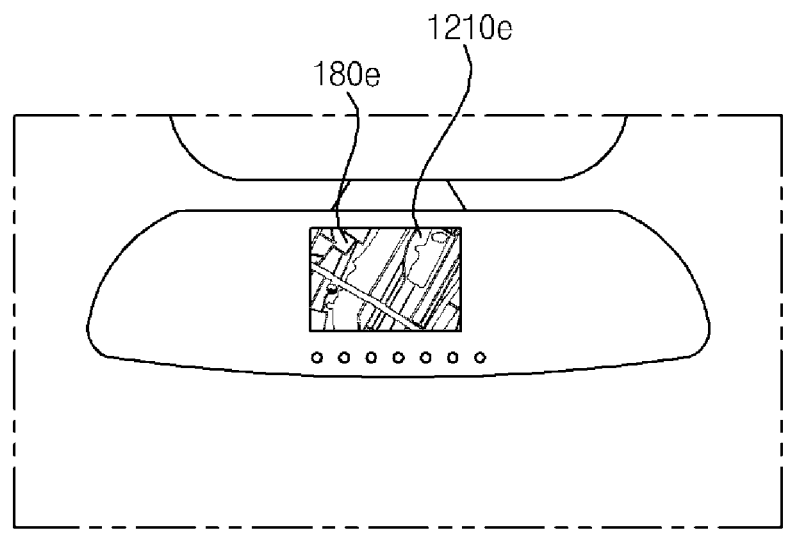

FIG. 12C illustrates that a display 180e is formed on a rear-view mirror in the vehicle in order to display an image 1210e.

For example, in the case in which FIGS. 12A and 12C are linked to each other, identical images 1210a, 1210b, and 1210e may be displayed respectively on the first display 180a, the second display 180b, and the rear-view mirror display 180e in the vehicle.

Meanwhile, in the case in which the second virtual machine 530 is operated for rendering of the first display 180a, the third virtual machine 540 is operated for rendering of the second display 180b, and the fourth virtual machine (not shown) is operated for rendering of the rear-view mirror display 180e, 1:N data communication by the first virtual machine 520 is performed, whereby synchronized images are displayed, as shown in the figure.

As another example, in the case in which FIGS. 12B and 12C are linked to each other, identical images 1210a, 1210b, 1210c, 1210d, and 1210e may be displayed respectively on the first display 180a, the second display 180b, the third display 180c, the fourth display 180d, and the rear-view mirror display 180e in the vehicle.

Figure 13:
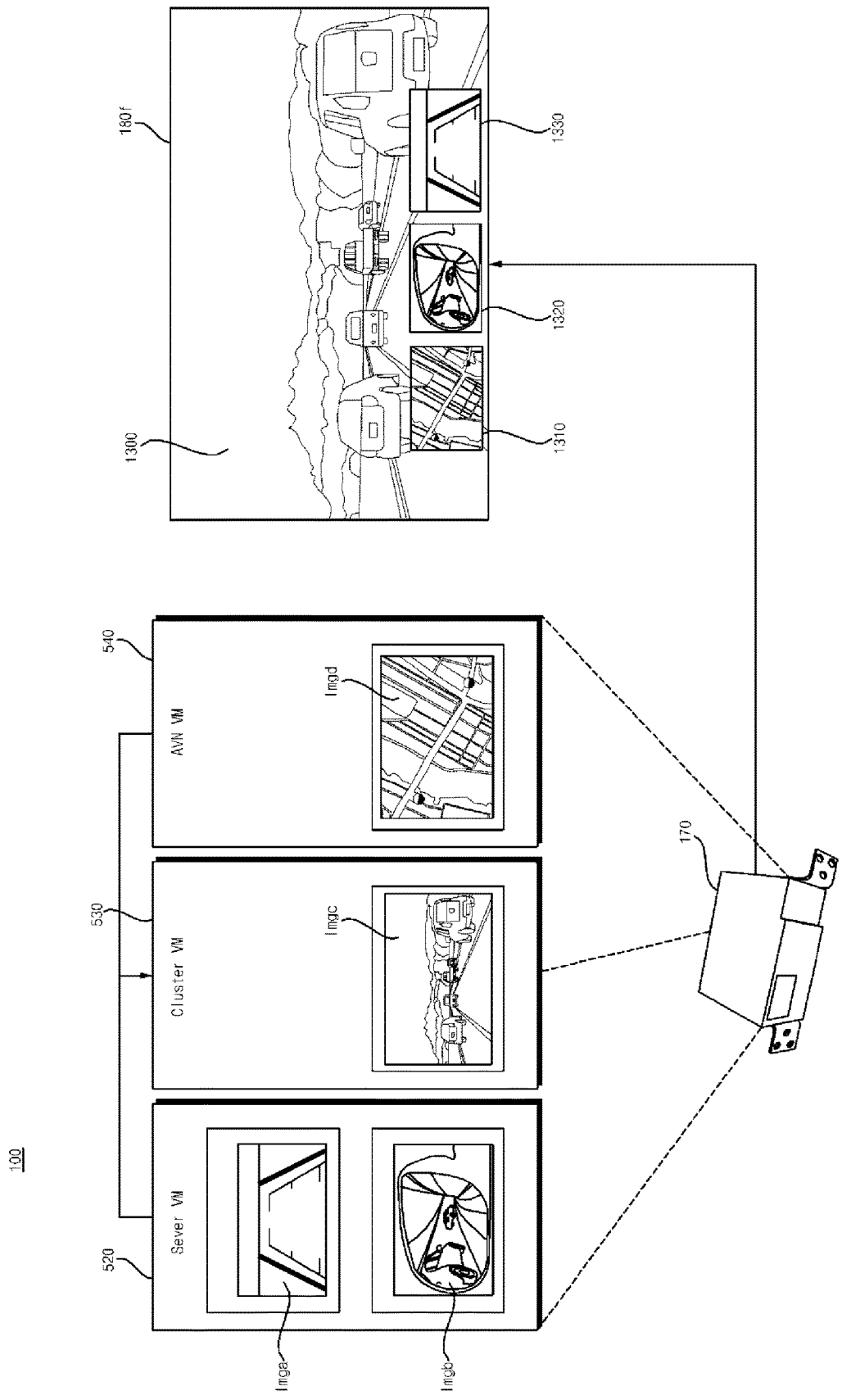

FIG. 13 illustrates that a HUD display 180f is disposed in the vehicle.

Referring to the figure, the display apparatus 100 for vehicles may include a first display 180a corresponding to an instrument cluster, a second display 180b corresponding to an AVN, and a HUD display 180f.

The signal processing device 170 may perform control such that an image obtained by synthesizing first image data processed by the first virtual machine 520, second image data processed by the second virtual machine 530, and third image data processed by the third virtual machine 540 is displayed on the HUD display 180f.

The figure illustrates that the first virtual machine 520 processes rear-view mirror image data Imga and side mirror image data Imgb, the second virtual machine 530 processes front camera image data Imgc, the third virtual machine 540 processes navigation image data Imgd, and an image obtained by synthesizing the four image data is displayed on the HUD display 180f, which is a third display.

The figure illustrates that an image 1300 corresponding to the front camera image data Imgc is a background, and images 1310, 1320, and 1330 corresponding respectively to the navigation image data Imgd, the side mirror image data Imgb, and the rear-view mirror image data Imga are displayed together. As a result, synchronized images may be displayed together. Consequently, it is possible for a user to check all images around the vehicle through the HUD display 180f.

Figure 14:
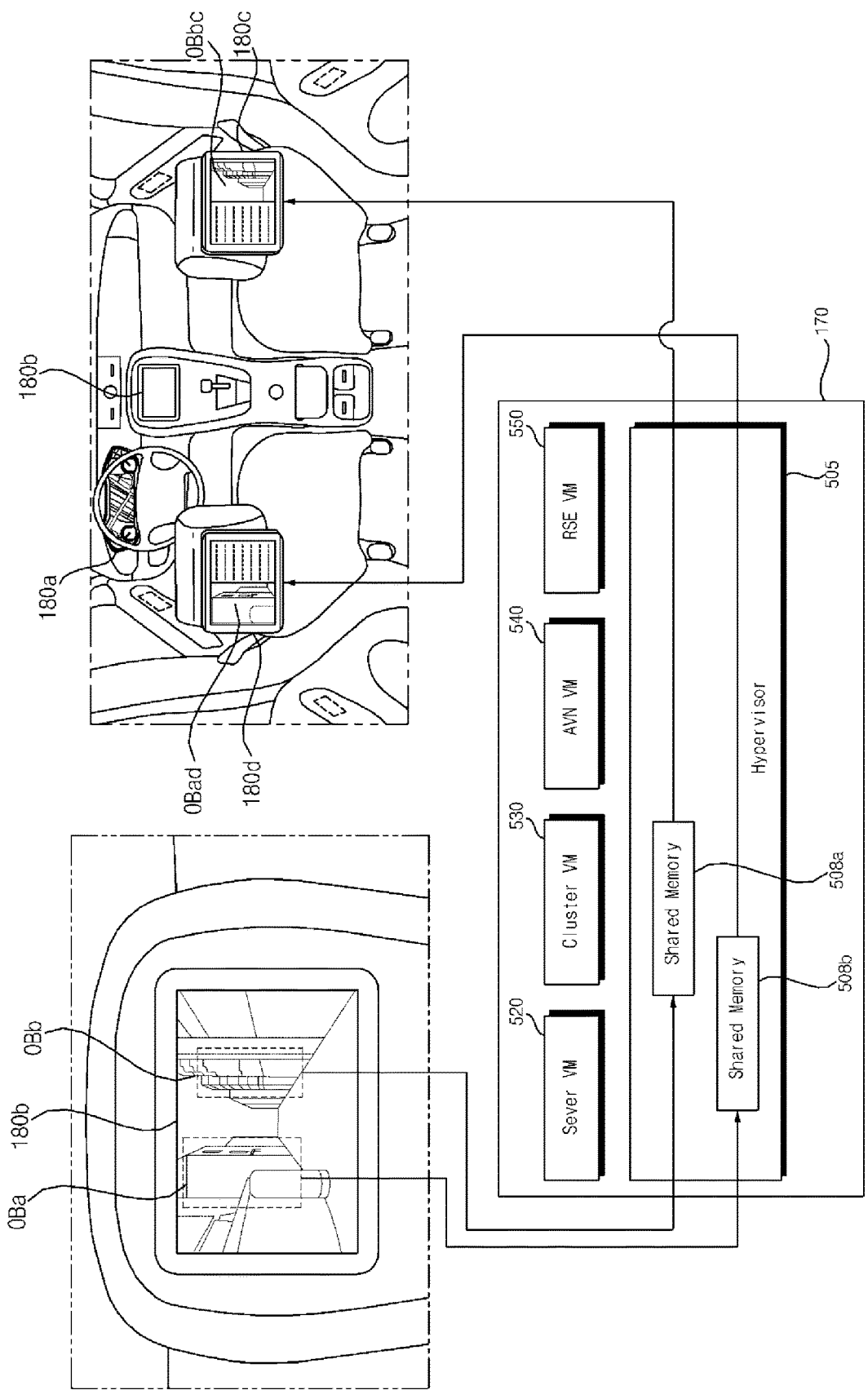

FIG. 14 illustrates that portions Oba and OBb of an image displayed on the second display 180b are processed and displayed on the third display 180c and the fourth display 180d, which are RSE displays, in a synchronized state.

The figure illustrates that a partial image OBad is displayed on the third display 180c and another partial image OBbd is displayed on the fourth display 180d in a synchronized state.

Figure 15:
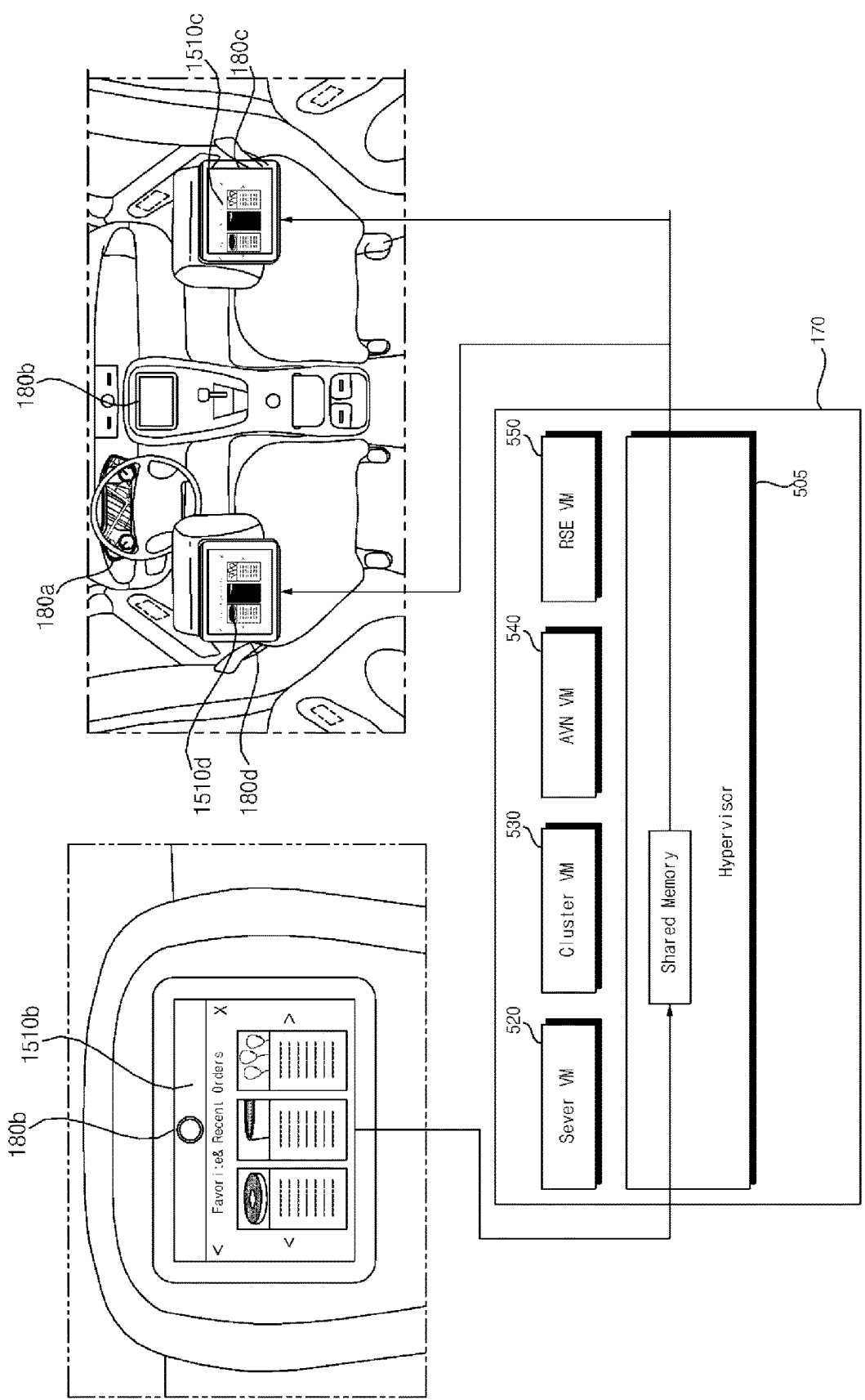

FIG. 15 illustrates that an image 1510b displayed on the second display 180b is processed and displayed on the third display 180c and the fourth display 180d, which are RSE displays, in a synchronized state.

The figure illustrates that an identical image 1510c is displayed on the third display 180c and an identical image 1510d is displayed on the fourth display 180d in a synchronized state.

Meanwhile, in the display apparatus 100 for vehicles according to the embodiment of the present disclosure, the first virtual machine 520 in the signal processing device 170 may receive first touch input on the first display 180a through the second virtual machine 530 and may transmit image data processed based on the first touch input to the second virtual machine 530 and the third virtual machine 540 through the shared memory 508, and the first display 180a and the second display 180b may display identical images corresponding to the first touch input. Consequently, the plurality of displays 180a and 180b in the vehicle may display identical images in a synchronized state.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A signal processing device comprising a processor configured to process a signal for a display mounted in a vehicle, wherein
    the processor is configured to execute first to third virtual machines on a hypervisor in the processor,
    the second virtual machine is operated for a first display,
    the third virtual machine is operated for a second display, and
    the first virtual machine in the processor is configured to control a shared memory based on the hypervisor for transmission of identical data to the second virtual machine and the third virtual machine,
    the first virtual machine in the processor comprises an input and output server interface and a security manager,
    each of the second virtual machine and the third virtual machine comprises an input and output client interface,
    the input and output server interface is configured to receive information regarding a first buffer in the shared memory, the first buffer being empty, write first data in the first buffer in the shared memory, and transmit buffer information of the first buffer to the input and output client interfaces in the second virtual machine and the third virtual machine,
    a reference count of the first buffer is changed in a first direction based on writing of the first data in the first buffer, and
    in case in which copying of the first data to the first buffer is completed, the reference count of the first buffer is changed in a second direction, the second direction being opposite the first direction.

2. The signal processing device of claim 1, wherein the first virtual machine is configured to receive and process position information data variable due to movement, and transmit the processed data to the second virtual machine or the third virtual machine.

3. The signal processing device of claim 1, wherein the second virtual machine and the third virtual machine are operated by different operating systems.

4. The signal processing device of claim 1, wherein the first virtual machine in the processor is configured to transmit information regarding the shared memory comprising key data for data access to the second virtual machine and the third virtual machine after setting of the shared memory.

5. The signal processing device of claim 1, wherein
in order to transmit data from the input and output server interface in the first virtual machine to the input and output client interface,
the security manager is configured to allocate the shared memory, and
the input and output client interface is configured to transmit a request for connection to the input and output server interface after allocation of the shared memory.

6. The signal processing device of claim 1, wherein
the input and output server interface is configured to transmit information regarding the shared memory comprising key data for data access to the input and output client interface after allocation of the shared memory, and
the input and output client interface is configured to accesses the shared memory based on the key data.

7. The signal processing device of claim 1, wherein
the shared memory comprises a plurality of buffers,
the first virtual machine is configured to write first frame data to third frame data respectively in the first buffer to a third buffer, among the plurality of buffers, and
the input and output client interfaces in the second virtual machine and the third virtual machine sequentially copy the first frame data to the third frame data from the first buffer to the third buffer.

8. The signal processing device of claim 7, wherein, after copying of the first frame data from the first buffer by the input and output client interface in the third virtual machine is completed, the second virtual machine is configured to copy the second frame data from the second buffer.

9. The signal processing device of claim 1, wherein
the first virtual machine comprises a position information driver configured to process position information, a touch driver configured to process touch input, and a camera driver configured to process an image from a camera, and
the first virtual machine is configured to control the shared memory based on the hypervisor for each of the position information driver, the touch driver, and the camera driver.

10. The signal processing device of claim 9, wherein the input and output server interface configured to set a first shared memory for transmission of image data from the camera driver, and set a second shared memory for transmission of position information from the position information driver.

11. The signal processing device of claim 7, wherein
key data of the first shared memory and key data of the second shared memory are transmitted to the second virtual machine and the third virtual machine, and
the second virtual machine and the third virtual machine access the first shared memory and the second shared memory based on the key data of the first shared memory and the key data of the second shared memory.

12. The signal processing device of claim 1, further comprising:
a legacy virtual machine configured to receive and process Ethernet data, wherein
the first virtual machine is configured to receive, process, and output vehicle sensor data, position information data, camera image data, audio data, or touch input data.

13. The signal processing device of claim 12, wherein the first virtual machine is configured to write the vehicle sensor data, the position information data, the camera image data, or the touch input data in the shared memory, for sharing identical data in the second virtual machine and the third virtual machine.

14. The signal processing device of claim 1, wherein the first virtual machine is configured to receive and process wheel speed sensor data of the vehicle, and transmit the processed wheel speed sensor data to at least one of the second virtual machine and the third virtual machine.

15. A display apparatus for vehicles, the display apparatus comprising:
a first display;
a second display; and
a signal processing device comprising a processor configured to process signals for the first display and the second display, wherein:
the processor is configured to execute first to third virtual machines on a hypervisor in the processor,
the second virtual machine is operated for the first display,
the third virtual machine is operated for the second display,
the first virtual machine in the processor is configured to control a shared memory based on the hypervisor for transmission of identical data to the second virtual machine and the third virtual machine,
the first virtual machine in the processor comprises an input and output server interface and a security manager,
each of the second virtual machine and the third virtual machine comprises an input and output client interface,
the input and output server interface is configured to receive information regarding a first buffer in the shared memory, the first buffer being empty, write first data in the first buffer in the shared memory, and transmit buffer information of the first buffer to the input and output client interfaces in the second virtual machine and the third virtual machine,
a reference count of the first buffer is changed in a first direction based on writing of the first data in the first buffer, and
in case in which copying of the first data to the first buffer is completed, the reference count of the first buffer is changed in a second direction, the second direction being opposite the first direction.

16. The display apparatus of claim 15, wherein the signal processing device is configured to transmit identical data to a plurality of virtual machines in a synchronized state, and display an identical image on a plurality of displays.

* * * * *